United States Patent
Kamiyama

(10) Patent No.: US 10,294,342 B2
(45) Date of Patent: May 21, 2019

(54) FILM OBTAINED BY LAMINATING COATING LAYER MADE OF FLUORINE-CONTAINING ACRYLIC RESIN ON BASE FILM

(71) Applicant: Kaneka Corporation, Osaka (JP)

(72) Inventor: Hiroshi Kamiyama, Takasago (JP)

(73) Assignee: KANEKA CORPORATION, Osaka (JP)

( * ) Notice: Subject to any disclaimer, the term of this patent is extended or adjusted under 35 U.S.C. 154(b) by 248 days.

(21) Appl. No.: 15/350,755

(22) Filed: Nov. 14, 2016

(65) Prior Publication Data

US 2017/0058088 A1    Mar. 2, 2017

Related U.S. Application Data

(63) Continuation of application No. PCT/JP2015/002381, filed on May 11, 2015.

(30) Foreign Application Priority Data

May 15, 2014    (JP) ................................. 2014-101765

(51) Int. Cl.
| | | |
|---|---|---|
| C08J 7/04 | (2006.01) | |
| B32B 27/30 | (2006.01) | |
| C09D 133/16 | (2006.01) | |
| C08F 220/22 | (2006.01) | |
| C08F 220/24 | (2006.01) | |
| C08F 20/22 | (2006.01) | |
| B32B 27/08 | (2006.01) | |
| C08F 20/24 | (2006.01) | |
| B32B 27/20 | (2006.01) | |
| C08F 265/06 | (2006.01) | |
| B32B 37/15 | (2006.01) | |
| B32B 37/12 | (2006.01) | |

(52) U.S. Cl.
CPC ................. *C08J 7/04* (2013.01); *B32B 27/08* (2013.01); *B32B 27/20* (2013.01); *B32B 27/30* (2013.01); *B32B 27/308* (2013.01); *C08F 20/22* (2013.01); *C08F 20/24* (2013.01); *C08F 220/22* (2013.01); *C08F 265/06* (2013.01); *C08J 7/047* (2013.01); *B32B 37/153* (2013.01); *B32B 2037/1215* (2013.01); *B32B 2250/02* (2013.01); *B32B 2250/246* (2013.01); *B32B 2255/10* (2013.01); *B32B 2255/26* (2013.01); *B32B 2262/02* (2013.01); *B32B 2264/0207* (2013.01); *B32B 2307/412* (2013.01); *B32B 2307/536* (2013.01); *B32B 2307/546* (2013.01); *B32B 2307/714* (2013.01); *B32B 2419/00* (2013.01); *B32B 2451/00* (2013.01); *B32B 2571/00* (2013.01); *B32B 2605/00* (2013.01); *B32B 2605/003* (2013.01); *C08F 220/24* (2013.01); *C08J 2333/06* (2013.01); *C08J 2333/16* (2013.01); *C08J 2433/16* (2013.01); *C09D 133/16* (2013.01)

(58) Field of Classification Search
CPC .......................... C09D 133/062; C09D 133/16
See application file for complete search history.

(56) References Cited

U.S. PATENT DOCUMENTS

| | | | |
|---|---|---|---|
| 2007/0276107 A1 | 11/2007 | Wada et al. | |
| 2009/0072433 A1 | 3/2009 | Wada et al. | |

FOREIGN PATENT DOCUMENTS

| | | | | |
|---|---|---|---|---|
| EP | 0298174 A1 | * | 1/1989 | ............ C08F 220/24 |
| JP | S57187248 A | | 11/1982 | |
| JP | S63301266 A | | 12/1988 | |
| JP | H0550566 A | | 3/1993 | |
| JP | H0680794 A | | 3/1994 | |
| JP | 2004212619 A | | 7/2004 | |
| JP | 2011168681 A | | 9/2011 | |
| JP | 2012187934 A | | 10/2012 | |
| WO | 2006016618 A1 | | 2/2006 | |
| WO | 2011102132 A1 | | 8/2011 | |

OTHER PUBLICATIONS

English language machine translation of EP0298174A1 (Year: 1989).*

(Continued)

*Primary Examiner* — Ramsey Zacharia

(74) *Attorney, Agent, or Firm* — Osha Liang LLP

(57) ABSTRACT

A film includes: a coating layer made of a fluorine-containing acrylic resin; and a base film, on which the coating layer is laminated. The fluorine-containing acrylic resin is obtained by copolymerizing 50 to 99 parts by weight of a monomer represented by a general formula (1) with 50 to 1 parts by weight of a methacrylate-based monomer, and a melt viscosity of the fluorine-containing acrylic resin is less than 300 Pa·s under conditions of a die temperature of 220° C., a shear rate of 122 sec$^{-1}$, and a capillary die diameter of 1 mm based on JIS K7199.

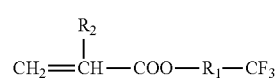

(1)

In the general formula (1), $R_1$ is a direct bond or a straight-chain or branched-chain alkylene group containing 1 to 4 carbon atoms, and $R_2$ is methyl.

12 Claims, No Drawings

(56) References Cited

OTHER PUBLICATIONS

Yamakawa et al., Influence of acrylonitrile-butadiene-styrene (ABS) morphology and poly(styrene-co-acrylonitrile) (SAN) content on fracture behavior of ABS/SAN blends, Journal of Applied Polymer Science, vol. 92, pp. 2606-2611 (Year: 2004).*
International Search Report issued in corresponding International Application No. PCT/JP2015/002381 dated Jun. 9, 2015 (5 pages).
Written Opinion issued in corresponding International Application No. PCT/JP2015/002381 dated Jun. 9, 2015 (10 pages).

* cited by examiner

FILM OBTAINED BY LAMINATING COATING LAYER MADE OF FLUORINE-CONTAINING ACRYLIC RESIN ON BASE FILM

TECHNICAL FIELD

One or more embodiments of the invention relate to a film obtained by laminating a fluorine-based resin layer on a base film.

BACKGROUND

In recent years, harmful substance emission in the process of painting and plating in the forming of vehicle components has been restricted more tightly from an environmental point of view. Accordingly, in particular, acrylic decoration films and protection films have been attracting attention as alternatives to such substances and for use in protecting the components. These protection films and decoration films are used in such a manner that the films are adhered to the surface of a base material. Therefore, such a film is required to have sufficient transparency to allow printing and patterns on the surface of the base material to be clearly visible, and is also required to have flex cracking resistance during insert molding or in-mold forming.

Moreover, since the film itself is printed, the film is required to have chemical resistance, and in addition, the film needs to have stain resistance to lactic acid components contained in human sebum and sweat and to sunscreens, for example, Coppertone (registered trademark), used on human skin during the summer season and in a hot region, because vehicle interior components frequently come into contact with human hands, and there are increasing cases of base material degradation that occurs when the aforementioned lactic acid components and/or sunscreens adhere to the vehicle interior components.

As films that satisfy these quality requirements, a multi-layer film produced by coextrusion molding of a methacrylic resin composition with a fluororesin that is excellent in terms of weatherability and chemical resistance, and an acrylic resin film having a surface hard-coated with a fluororesin, have been drawing strong attention in the market. In particular, the following method is attracting strong attention, in which: a film obtained by laminating a vinylidene fluoride-based resin, which is a melt-moldable fluororesin, on an acrylic resin is used as decoration on the surface of a plastic molded article so as to serve as an alternative to painting on the surface.

However, a vinylidene fluoride-based resin is a crystalline resin, and has a high crystallization speed. For this reason, achieving satisfactory transparency with such a vinylidene fluoride-based resin is highly difficult. In view of this, thinning of the film (see Patent Literature 1), mixing of a vinylidene fluoride resin with a methacryl resin (see Patent Literature 2), control of molding conditions in film processing (extrusion molding temperature, discharge rate, and residence time in an extruder) (see Patent Literature 3), etc., have been proposed. However, it is difficult to achieve required transparency with these methods.

In addition, with vinylidene fluoride resins, it is also difficult to realize surface strength desired for the aforementioned use.

Consideration has also been given to a method of obtaining a vinylidene fluoride resin film that is excellent in terms of transparency and surface smoothness by sandwiching a vinylidene fluoride resin with metal rolls adjusted to have a suitable temperature (see Patent Literature 4). However, in the case of adopting such a method, due to increase in processing steps, installation of new equipment or modification of existing equipment may become necessary, which is economically disadvantageous. Therefore, a method that makes it possible to produce a vinylidene fluoride resin film in a simpler manner is desired.

If a fluorine-containing alkyl (meth)acrylate-based resin is formed into a film by extrusion molding, die lines occur due to resin deposit that is caused by thermal decomposition of the resin. This causes a difficulty in stable film production (see Patent Literatures 5 and 6).

In one method, a hard coating layer, and an antireflection layer made of a fluorine-containing and alkyl-group-containing (meth)acrylate, are sequentially laminated on a base film by wet coating, which causes no thermal degradation (see Patent Literature 7). However, applying this method to insert molding or in-mold forming is difficult, because the hard coating layer is three-dimensionally crosslinked and it is difficult to perform vacuum molding of the hard coating layer.

CITATION LIST

Patent Literature

PTL 1: Japanese Laid-Open Patent Application Publication No. S57-187248
PTL 2: Japanese Laid-Open Patent Application Publication No. H05-50566
PTL 3: Japanese Laid-Open Patent Application Publication No. H06-80794
PTL 4: WO 2006/016618
PTL 5: Japanese Laid-Open Patent Application Publication No. 2011-168681
PTL 6: Japanese Laid-Open Patent Application Publication No. 2012-187934
PTL 7: Japanese Laid-Open Patent Application Publication No. 2004-212619

SUMMARY OF INVENTION

In view of the above, one or more embodiments of the present invention provide a novel multilayer film that is applicable for use in vehicle interior and exterior components and that is well-balanced in terms of transparency, surface hardness, chemical resistance, stain resistance to lactic acid components contained in human sebum and sweat and to sunscreens, and film productivity.

The inventors of the present invention conducted diligent studies, and as a result of the studies, the inventors have successfully fabricated a laminated film that is excellent in terms of transparency, surface hardness, chemical resistance, and stain resistance by using a fluorine-containing acrylic resin that contains a monomer represented by a general formula (1) below.

The inventors of the present invention have succeeded in laminating the fluorine-containing acrylic resin on a base film by a wet coating method, which does not cause thermal decomposition of the fluorine-containing acrylic resin. The inventors have found that even though the resulting laminated film includes a thin coating layer made of the fluorine-containing acrylic resin, the laminated film is well-balanced in terms of transparency, surface hardness, chemical resistance, stain resistance, thermal resistance, and film productivity. In addition, by specifying the acrylic resin of the fluorine-containing acrylic resin coating layer, which is laminated on the base film, the inventors have also found that the fluorine-based resin laminated acrylic resin film exhibits excellent flex cracking resistance and flex whitening resistance, which are necessary for the film to be applicable for use in the interior and exterior of vehicles.

Preferably, a film according to one or more embodiments of the present invention includes: a coating layer made of a fluorine-containing acrylic resin; and a base film, on which the coating layer is laminated. Preferably, the fluorine-containing acrylic resin is obtained by copolymerizing 50 to 99 parts by weight of a monomer represented by a general formula (1) with 50 to 1 parts by weight of a methacrylate-based monomer, and a melt viscosity of the fluorine-containing acrylic resin is less than 300 Pa's under conditions of a die temperature of 220° C., a shear rate of 122 $\sec^{-1}$, and a capillary die diameter of 1 mm based on JIS K7199.

[Chem. 1]

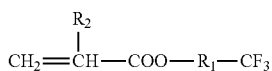

(1)

(In the general formula (1), $R_1$ is a direct bond or a straight-chain or branched-chain alkylene group containing 1 to 4 carbon atoms, and $R_2$ is methyl.)

Preferably, the base film is an acrylic resin containing rubber particles.

Preferably, a glass-transition temperature of the fluorine-containing acrylic resin is not lower than 70° C.

Preferably, a water contact angle of the coating layer at a temperature of 80° C. is not less than 85°.

Preferably, the methacrylate-based monomer is methyl methacrylate.

Preferably, the fluorine-containing acrylic resin is obtained by copolymerizing 70 to 99 parts by weight of the monomer represented by the general formula (1) with 30 to 1 parts by weight of the methyl methacrylate.

Preferably, the coating layer is laminated on the base film by a wet coating method.

The fluorine-based resin laminated acrylic resin film according to one or more embodiments of the present invention is excellent in terms of transparency, surface hardness, chemical resistance, stain resistance, and film productivity.

DESCRIPTION OF EMBODIMENTS

A fluorine-containing acrylic resin according to one or more embodiments of the present invention is obtained by copolymerizing 50 to 99 parts by weight of a monomer represented by a general formula (1) with 50 to 1 parts by weight of a methacrylate-based monomer. An acrylic resin film obtained by lamination of the fluorine-containing acrylic resin is excellent in terms of transparency, surface hardness, chemical resistance, and stain resistance to, for example, lactic acid and sunscreens.

[Chem. 2]

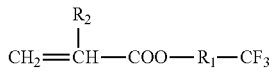

(1)

(In the general formula (1), $R_1$ is a direct bond or a straight-chain or branched-chain alkylene group containing 1 to 4 carbon atoms, and $R_2$ is methyl.)

The monomer represented by the general formula (1) may be a known monomer. Specific examples of the monomer include trifluoromethyl methacrylate, trifluoroethyl methacrylate, trifluoropropyl methacrylate, trifluorobutyl methacrylate, trifluorohexyl methacrylate, trifluorooctyl methacrylate, 1,1,1,3,3,3-hexafluoro-2-propyl methacrylate, 1,1,1,3,3,3-hexafluoro-2-propyl methacrylate, and 2-(trifluoromethyl)ethyl methacrylate).

Among these monomers, trifluoromethyl methacrylate and trifluoroethyl methacrylate, each of which is a methacrylate-based monomer having a trifluoromethyl group at its terminal, are preferable in light of transparency when formed into a film-shaped molded article, adhesion to a base film in a case where the base film is an acrylic resin, chemical resistance, and stain resistance to, for example, lactic acid and sunscreens.

The monomer represented by the above general formula (1) may be copolymerized with another copolymerizable monomer species. Examples a copolymerizable vinyl-based monomer as the other copolymerizable monomer species include: methyl methacrylate; ethyl methacrylate; n-propyl methacrylate; isopropyl methacrylate; n-butyl methacrylate; isobutyl methacrylate; t-butyl methacrylate; pentyl methacrylate; hexyl methacrylate; cyclohexyl methacrylate; 2-ethylhexyl methacrylate; adamantyl methacrylate; dodecyl methacrylate; isobornyl methacrylate; methyl acrylate; ethyl acrylate; n-propyl acrylate; isopropyl acrylate; n-butyl acrylate; isobutyl acrylate; t-butyl acrylate; pentyl acrylate; hexyl acrylate; cyclohexyl acrylate; 2-ethylhexyl acrylate; adamantyl acrylate; dodecyl acrylate; isobornyl acrylate; glycidyl methacrylate; glycidyl acrylate; allyl methacrylate; allyl acrylate; 3,4-epoxy cyclohexyl methyl methacrylate; 3,4-epoxy cyclohexyl methyl acrylate; phenyl methacrylate; phenyl acrylate; α-methylstyrene; p-vinyltoluene; methacrylamide; acrylamide; N,N-dimethyl methacrylamide; N,N-dimethyl acrylamide; acrylic acid-2,2,6,6-tetramethyl-4-piperidyl; aliphatic vinyl ether compounds, such as ethyl vinyl ether, isopropyl vinyl ether, n-propyl vinyl ether, n-butyl vinyl ether, isobutyl vinyl ether, 2-ethylhexyl vinyl ether, and cyclohexyl vinyl ether, 2,3-dihydrofuran; 3,4-dihydro-2H-pyran; trimethoxysilyl propyl methacrylate; maleic acid esters; fumaric acid esters; styrene; acrylonitrile; methacrylonitrile; 2-hydroxyethyl crotonate; 2-hydroxypropyl crotonate; 3-hydroxypropyl crotonate; 3-hydroxybutyl crotonate; 4-hydroxybutyl crotonate; 5-hydroxypentyl crotonate; 6-hydroxyhexyl crotonate; allyl group-containing compounds, such as allyl alcohol and allyl glycidyl ether; crotonic acid alkyl esters, such as methyl crotonate, ethyl crotonate, and propyl crotonate; aliphatic carboxylic acid vinyl esters, such as vinyl acetate, vinyl propionate, vinyl acetate, vinyl pivalate, vinyl caproate, vinyl caprylate, vinyl caprate, vinyl laurate, and vinyl stearate; alicyclic carboxylic acid vinyl esters, such as vinyl cyclohexane carboxylate; and aromatic carboxylic acid vinyl esters, such as vinyl benzoate, vinyl cinnamate, and p-t-butyl vinyl benzoate. One of these copolymerizable vinyl-based monomers may be used alone, or two or more of these monomer may be used in combination.

The other copolymerizable vinyl-based monomer is not an essential component. In the process of designing the film, if necessary, the other copolymerizable vinyl-based monomer may be suitably chosen and used by taking account of the base material, intended use of the film, etc.

Among the above copolymerizable vinyl-based monomers, methacrylic acid alkyl esters are more preferable in light of transparency when formed into a film-shaped molded article and adhesion to an acrylic resin. In particular, methyl methacrylate, ethyl methacrylate, propyl methacrylate, and butyl methacrylate having an alkyl group with 1 to 4 carbon atoms are preferable in light of chemical resistance and hardness.

With respect to the total of 100 parts by weight of the monomer represented by the general formula (1) and the methacrylate-based monomer, the fluorine-containing acrylic resin is preferably a polymer obtained by polymerizing 50 to 99 parts by weight of the monomer represented by the general formula (1) with 50 to 1 parts by weight of the methacrylate-based monomer in order to realize chemical resistance, thermal decomposition resistance, and water repellency at high temperatures. More preferably, the fluorine-containing acrylic resin is a polymer obtained by polymerizing 70 to 99 parts by weight of the monomer represented by the general formula (1) with 30 to 1 parts by weight of the methacrylate-based monomer.

The methacrylate-based monomer preferably contains 0.1 to 30 parts by weight of a methacrylic acid ester in which an alkyl ester has 1 to 4 alkyl chain carbon atoms, or more preferably contains 1 to 15 parts by weight of the methacrylic acid ester. Consequently, the glass-transition temperature of the fluorine-containing acrylic resin is increased; the water repellency of the fluorine-containing acrylic resin is kept at high temperatures; and the fluorine-containing acrylic resin has excellent lactic acid resistance. In the case of containing less than 80 parts by weight of a fluorine-containing alkyl (meth)acrylate, the film's water repellency, chemical resistance, and stain resistance to, for example, the aforementioned human use chemical products tend to be reduced. It is particularly preferable that the methacrylate-based monomer be methyl methacrylate.

In a case where the methacrylate-based monomer is methyl methacrylate, preferably, the fluorine-containing acrylic resin is obtained by copolymerizing 70 to 99 parts by weight of the monomer represented by the general formula (1) with 30 to 1 parts by weight of methyl methacrylate.

The fluorine-containing acrylic resin has a melt viscosity of preferably less than 300 Pa·sec, or more preferably less than 250 Pa·sec, under the conditions of a die temperature of 220° C., a shear rate of 122 sec$^{-1}$, and a capillary die diameter of 1 mm based on JIS K7199. The melt viscosity is correlated with resin entanglement. In order to form a coating layer, the melt viscosity of the fluorine-containing acrylic resin is preferably less than 300 Pa·sec, which causes less resin entanglement. If the melt viscosity is not less than 300 Pa·sec, then it may cause reduction in the lactic acid resistance.

Preferably, the fluorine-containing acrylic resin has a reduced viscosity of less than 0.2 dl/g. The reduced viscosity is correlated with resin entanglement. In order to form a coating layer, the reduced viscosity of the fluorine-containing acrylic resin is preferably less than 0.2 dl/g, which causes less resin entanglement. If the reduced viscosity is not less than 0.2 dl/g, it may result in the hardness of the coating layer being less than the pencil hardness.

The reduced viscosity herein is a measurement value obtained based on ISO1628-1 in the following manner: measure the flow time of a solution and the flow time of its solvent by using a standard viscosity tube at 25° C. in a constant temperature room; and calculate the reduced viscosity by using these measured values and the concentration of the solution. The solution is prepared by dissolving 0.1 g of the polymer in 100 ml of chloroform or methyl ethyl ketone.

The glass-transition temperature of the fluorine-containing acrylic resin is preferably 70° C. or higher, more preferably 75° C. or higher, and even more preferably 80° C. or higher, because the temperature inside an automobile becomes such a high temperature in summer, and when the glass-transition temperature is higher than these temperatures, the stain resistance can be kept advantageously.

The fluorine-containing acrylic resin may be copolymerized with an ultraviolet absorber represented by a general formula (2) in light of ultraviolet-ray shielding capacity, retention of ultraviolet-ray shielding capacity, and low likelihood of bleeding in mold processing.

[Chem. 3]

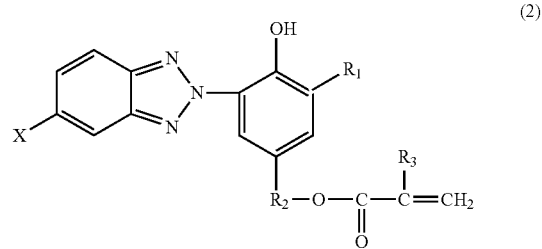

(2)

(In the general formula (2), X is H or a halogen atom; $R_1$ is H, methyl, or a t-alkyl group having 4 to 6 carbon atoms; $R_2$ is a straight-chain or branched-chain alkylene group having 2 to 10 carbon atoms; and $R_3$ is H or methyl.)

Examples of the ultraviolet absorber represented by the general formula (2) may be the same as those mentioned below in relation to an acrylic resin.

A method used for producing the fluorine-containing acrylic resin is not particularly limited, so long as it is a commonly used method. A known method such as emulsion polymerization, emulsion-suspension polymerization, suspension polymerization, bulk polymerization, solution polymerization, or dispersion polymerization is applicable. Among these methods, the production by suspension polymerization is preferable from the viewpoints of high hydrophobicity of the monomers and ease of after-treatment.

To be specific, preferably, polymerizable monomers including the methacrylate-based monomer and the monomer represented by the general formula (1), a dispersion stabilizer, a dispersion stabilization aid, an oil-soluble radical polymerization initiator, and ion-exchanged water are mixed together in a polymerization vessel, and polymerization is performed while stirring the mixture so as to impart shear force necessary for preventing unification.

Examples of the dispersion stabilizer include: gelatin; methyl cellulose; hydroxyethyl cellulose; hydroxypropyl cellulose; carboxymethyl cellulose; polyethylene glycol; polyethylene oxide; polyoxyethylene-polyoxypropylene block copolymer; polyacrylamide; polyacrylic acid; polyacrylates, such as sodium polyacrylate; alginic acid sodium salts, such as sodium alginate; water-soluble polymers, such as polyvinyl alcohol and partially saponified polyvinyl alcohol; and inorganic substances, such as tricalcium phosphate, titanium oxide, calcium carbonate, and silicon dioxide. Among these dispersion stabilizers, in particular, polyvinyl alcohol, partially saponified polyvinyl alcohol, hydroxypropyl cellulose, and tricalcium phosphate are used preferably.

One of these dispersion stabilizers may be used alone, or two or more of these dispersion stabilizers may be used in combination. The amount of the dispersion stabilizer to be used is, for example, 0.1 to 60 parts by weight, and preferably 0.1 to 30 parts by weight, with respect to 100 parts by weight of the polymerizable monomers. Most preferably, the amount of the dispersion stabilizer to be used is 0.1 to 5 parts by weight, because the less the dispersant residue, the more transparent the film becomes.

Examples of the oil-soluble radical initiator include: organic peroxides, such as benzoyl peroxide, o-methoxybenzoyl peroxide, o-chlorobenzoyl peroxide, lauroyl peroxide, and cumene hydroperoxide; and azo-based compounds, such as 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), dimethyl 2,2'-azobis(2-methyl propionate), 1,1'-azobis(cyclohexane-1-carbonitrile), 2,2'-azobis[N-(2-propenyl)-2-methylpropionamide], 1-[(1-cyano-1-methyl ethyl)azo] formamide, 2,2'-azobis(N-butyl-2-methylpropionamide), 2,2'-azobis(N-cyclohexyl-2-methylpropionamide), and 2,2'-azobis(I-imino-1-pyrrolidino-2-methylpropane)dihydrochloride. Among these radical polymerization initiators, those having a moderate 10-hr half-life temperature and being readily handleable compared to the other ones, such as benzoyl peroxide, lauroyl peroxide, 2,2'-azobisisobutyronitrile, and 2,2'-azobis(2-methylbutyronitrile), are used preferably. One of these radical polymerization initiators may be used alone, or two or more of these radical polymerization initiators may be used in combination. The amount of the radical polymerization initiator to be used is, for example, 0.1 to 5 parts by weight, and preferably 0.1 to 2 parts by weight, with respect to 100 parts by weight of the polymerizable monomers. More preferably, the amount of the radical polymerization initiator to be used is 0.1 to 1 parts by weight with respect to 100 parts by weight of the polymerizable monomers, because the less the polymerization initiator residue, the more transparent the film becomes. Preferably, the oil-soluble radical polymerization initiator is dissolved in the polymerizable monomers in advance.

If necessary, a surfactant may be further added for the purpose of stabilizing the dispersion of droplets of the polymerizable monomers. Examples of surfactants usable for this purpose include: anionic surfactants, such as sodium dodecylbenzenesulfonate, sodium dialkyl sulfosuccinate, and sodium lauryl sulfate; and non-ionic surfactants, such as polyethylene glycol nonyl phenyl ether. One of these surfactants may be used alone, or two or more of these surfactants may be used in combination. The amount of the surfactant to be used is, for example, 0.05 to 2 parts by weight with respect to 100 parts by weight of the polymerizable monomers.

If necessary, an inhibitor for inhibiting aqueous phase polymerization, such as sodium nitrite, may be added.

In a preferable method of generating polymer particles by suspension polymerization, prior to initiation of the polymerization reaction, the size of monomer oil droplets is adjusted to a desired size by shear force that is generated by stirring the mixture of the polymerizable monomers, the dispersion stabilizer, the oil soluble radical polymerization initiator, and ion exchanged water.

In this case, various types of dispersion means, such as a homomixer, homodisperser, homogenizer, and a line mixer, may be preferably used for forming fine monomer oil droplets whose size is not more than 30 μm. The size of the monomer oil droplets can be controlled by adjusting the shear force, which depends on, for example, the rotation speed of the dispersion means.

The temperature of the monomer oil droplets (i.e., a polymerizable monomer dispersion liquid) prepared in this manner is usually increased to the 10-hr half-life temperature of the radical polymerization initiator, and a polymerization reaction is caused to obtain a polymer particle suspension. For example, radical polymerization is performed by increasing the temperature to be not lower than 55° C. when lauroyl peroxide is used as the radical initiator, or not to be lower than 65° C. when 2,2'-azobisisobutyronitrile is used as the radical initiator.

The polymerization reaction liquid undergoes various after-treatment operations, such as a dewatering operation, and if necessary, a salting-out operation. As a result, fluorine-containing alkyl (meth)acrylate polymer components obtained through the polymerization are obtained in the form of powder (i.e., fine particles), and then used.

The obtained fine particles of the fluorine-containing acrylic resin have a mean particle diameter of preferably 0.5 to 200 μm or more preferably 1 to 100 μm.

It should be noted that the mean particle diameter of the fine particles of the fluorine-containing alkyl (meth)acrylate polymer components of one or more embodiments of the present invention is a value measured by a light-scattering method in a latex or slurry state by using a Microtrac particle size distribution measuring device MT3000 available from Nikkiso Co., Ltd.

Although the shape of the fine particles of the fluorine-containing acrylic resin is not particularly limited, the particles are preferably spherical or spheroid, for example.

A general film production method can be adopted as a method of producing a film that is obtained by laminating the fluorine-based resin layer of one or more embodiments of the present invention on a base film. Examples of adoptable film production methods include a wet coating method, a dry lamination method, a wet lamination method, a hot melt lamination method, a heat press lamination method, an extrusion lamination method, in which lamination is performed while forming the resin into the shape of a film by melt extrusion with a T die or the like, and a coextrusion method, in which fusion bonding is performed inside a die, or outside a die such as a multi-slot method.

Thermal decomposition of the fluorine-containing acrylic resin tends to easily occur. Therefore, for example, if melt extrusion molding is adopted, a defect tends to occur due to a resin degradation product. It is preferable to adopt a method of laminating the fluorine-containing acrylic resin as a coating layer, because in such a method, the fluorine-containing acrylic resin receives a less amount of heat. By choosing a method of laminating the fluorine-containing acrylic resin as a coating layer, in which method the fluorine-containing acrylic resin receives a less amount of heat, a methacrylate monomer can be used in the fluorine-containing resin even though thermal decomposition of the methacrylate monomer tends to easily occur.

Thermal stability of the fluorine-containing acrylic resin is low, and in the case of adopting melt extrusion, the fluorine-containing acrylic resin receives a relatively large amount of heat, and also, the residence time of part of the fluorine-containing acrylic resin tends to be prolonged in the extruder. Therefore, if the film production is performed by melt extrusion over a long period of time, thermal decomposition of the resin will occur. Therefore, it is most preferable to adopt a wet coating method, which does not cause thermal decomposition of the resin due to the received heat.

Specifically, thermal decomposition of the fluorine-containing alkyl (meth)acrylate-based polymer tends to easily occur, so that die lines frequently occur due to foaming and gel formation (unmolten substance). This causes significant degradation in productivity. In view of this, it is preferable to prepare a solution of the fluorine-containing alkyl (meth) acrylate-based polymer, and apply the solution onto the base film by a wet coating method, thereby performing the lamination.

Examples of the wet coating method include known coating methods, such as flow coating, spray coating, bar coating, gravure coating, gravure reverse coating, kiss reverse coating, micro gravure coating, roll coating, blade coating, rod coating, roll doctor coating, air knife coating, comma roll coating, reverse roll coating, transfer roll coating, kiss roll coating, curtain coating, die coating, and dipping coating. In particular, the use of a vacuum die coater is preferable. With the use of a vacuum die coater, stagnation of the coating liquid can be reduced, and the air gap can be increased.

In the case of performing the lamination by a wet coating method, it is preferable to adopt, for example, solution polymerization in an organic solvent. The polymerization technique to be adopted is not particularly limited. For example, radical polymerization, cationic polymerization, or anionic polymerization is adoptable. Among these, radical polymerization is suitable from an industrial point of view. Examples of preferable polymerization initiators used in the radical polymerization include: organic peroxides, such as t-butyl hydroperoxide, cumene hydroperoxide, t-butyl peroxyneodecanoate, t-butyl peroxypivalate, t-hexyl peroxy-2-ethyl hexanoate, and methyl ethyl ketone peroxide; and azo-based initiators, such as 2,2'-azobis(2,4-dimethylvaleronitrile), 2,2'-azobis(2-methylpropionitrile) (AIBN), and 2,2'-azobis(2-methylbutyronitrile). The polymerization initiator is of course not limited to these examples. One of these radical polymerization initiators may be used alone, or two or more of these radical polymerization initiators may be used in combination.

In general, the reaction temperature at the time of performing the radical polymerization is preferably 60 to 150° C. If the temperature is lower than 60° C., the radical polymerization initiator is not smoothly decomposed, and the reaction does not progress smoothly. On the other hand, if the temperature is higher than 150° C., even though the radical polymerization initiator is decomposed by heat and radicals are generated, the life thereof is short, and the growth reaction does not progress effectively. The polymerization time depends on the polymerization temperature and other conditions, and cannot be fixed to a specific period of time. However, in general, it will suffice if the polymerization time is set to about 2 to 6 hours.

In one or more embodiments of the present invention, the organic solvent is not particularly limited, so long as each component can be dissolved therein. It is preferable to choose an organic solvent that will not remain after baking. Examples of the organic solvent include: aliphatic hydrocarbons, such as n-hexane, n-heptane, and n-octane; aromatic hydrocarbons, such as benzene, toluene, and xylene; halogenated hydrocarbons, such as chloroform and carbon tetrachloride; alcohols, such as methanol, ethanol, n-propyl alcohol, isopropyl alcohol, and n-butyl alcohol; ethers, such as dibutyl ether, tetrahydrofuran, and 1,4-dioxane; ketones, such as acetone, methyl ethyl ketone, and methyl isobutyl ketone; and esters, such as ethyl acetate, n-propyl acetate, and n-butyl acetate. A soluble amount of water may be added to any of these organic solvents, and the resulting mixture may be used as a solvent. One of these solvents may be used alone, or two or more of these solvents may be used in combination. It is desirable to adjust the blending amount of the organic solvent to realize suitable coating viscosity. For example, in the case of adopting gravure coating, it is preferable to adjust the blending amount of the organic solvent to realize the viscosity of 20 to 300 mPa·s, and in the case of adopting die coating, it is preferable to adjust the blending amount of the organic solvent to realize the viscosity of 100 to 3000 mPa·s.

The fluorine-based resin film of one or more embodiments of the present invention is formed by using the above fluorine-based (meth)acrylic resin. The fluorine-based resin film of one or more embodiments of the present invention improves, for example, foaming and die lines and has beautiful film appearance owing to wet coating, and also, is excellent in terms of transparency, surface hardness, chemical resistance, and stain resistance to, in particular, for example, lactic acid derived from contact with humans and chemical products commonly used by humans, such as sunscreens. Therefore, the fluorine-based resin film of one or more embodiments of the present invention is applicable to, for example, automobile interior components that undergo insert molding or in-mold forming.

In one or more embodiments, the thickness of a film obtained by laminating a coating layer of the present invention on a base film is preferably 30 to 300 μm, and more preferably 30 to 200 μm, from the viewpoints of formability and transparency.

After the coating layer is laminated on the base film, the water contact angle of the film-coating layer at a temperature of 80° C. is preferably 85° or greater, and more preferably 90° or greater. For example, in the case of using the coating layer in the interior of an automobile, since it is possible that the temperature inside the automobile becomes high particularly in summer, if the coating layer is capable of keeping high water repellency even in such a high-temperature state, then the stain resistance to the lactic acid components contained in human sebum and sweat and to sunscreens will be exerted advantageously.

In one or more embodiments, the film obtained by laminating a fluorine-based resin layer of the present invention on a base film is such that a coating layer made of the fluorine-containing acrylic resin is laminated on at least one surface of the base film. Also, the film obtained by laminating the fluorine-based resin layer of one or more embodiments of the present invention on the base film is such that the fluorine-containing acrylic resin is laminated on the base film by a wet coating method, which does not cause thermal decomposition of the resin, and thereby foaming and die lines are eliminated. Consequently, beautiful film appearance and stable film production are realized.

The base film is preferably made of an acrylic resin. In one or more embodiments, by adopting a base film made of an acrylic resin, a film obtained by laminating a fluorine-based resin layer of the present invention on the base film realizes well-balanced film properties in terms of transparency, surface hardness, chemical resistance, and stain resistance to, in particular, lactic acid components derived from contact with humans and chemical products commonly used by humans, such as sunscreens, while taking advantage of excellent properties of the acrylic resin. The base film is preferably made of an acrylic resin containing rubber particles since the use of such an acrylic resin is preferable in light of flex cracking resistance, flex whitening resistance, and thermoformability. Examples of the rubber particles include: core-shell rubber particles having a specific particle diameter and rubber particle crosslinking density as disclosed in Japanese Laid-Open Patent Application Publication No. 2003-73520; and core-shell rubber particles with a hard/soft/hard multilayer structure in which hard crosslinked acrylic particles are contained inside crosslinked rubber particles, the core-shell rubber particles exhibiting well-balanced transparency and cracking resistance, as disclosed in Japanese Examined Patent Application Publication No. S55-27576 and Japanese Patent Publication No. 3563166.

The acrylic resin may be a known acrylic resin. Preferably, from the viewpoints of hardness and formability, the acrylic resin contains a polymer that is obtained by polymerizing 50 to 100 parts by weight of methyl methacrylate with 0 to 50 parts by weight of another monomer. As the other monomer, another copolymerizable vinyl-based monomer used in (c-1b) described below can be suitably used.

In one or more embodiments of the present invention, preferably, the acrylic resin has a resin composition containing an acrylic elastic body graft copolymer (C-1) in light of excellent flex cracking resistance and flex whitening resistance, or has a resin composition containing the acrylic elastic body graft copolymer (C-1) and a methacrylic polymer (C-2) in light of excellent surface hardness.

The acrylic elastic body graft copolymer (C-1) and the methacrylic polymer (C-2), each of which is obtained through polymerization, may be mixed together in the form of, for example, latex, powder, beads, or pellets, and the resulting mixture can be used as the acrylic resin.

Alternatively, the acrylic resin can be produced in the following method: producing the acrylic graft copolymer (C-1) in a reactor; and then producing the methacrylic polymer (C-2) in the same reactor immediately after the production of the acrylic graft copolymer (C-1).

The acrylic elastic body graft copolymer (C-1) is preferably obtained by copolymerizing a monomer mixture (c-1b) containing 50 to 100% by weight of a methacrylic acid ester and 0 to 50% by weight of another copolymerizable vinyl-based monomer with an acrylic acid ester-based crosslinked elastic body (i.e., a crosslinked elastic body containing an acrylic acid ester as its major component).

The acrylic acid ester-based crosslinked elastic body that can be preferably used is obtained by polymerizing a monomer mixture (c-1a). The monomer mixture (c-1a) contains an acrylic acid ester, another copolymerizable vinyl-based monomer as needed, and a polyfunctional monomer having at least two non-conjugated double bonds per copolymerizable molecule. The monomer(s) and the polyfunctional monomer may be entirely mixed together (single-stage polymerization), and the resulting mixture may be used. Alternatively, the monomer(s) and the polyfunctional monomer may be used in two or more stages of polymerization (multi-stage polymerization) in such a manner that their compositions are varied in each stage.

The acrylic acid ester in the acrylic acid ester-based crosslinked elastic body is preferably an acrylic acid alkyl ester in light of polymerizability and costs, and an acrylic acid alkyl ester having an alkyl group with 1 to 12 carbon atoms can be used. Specific examples of preferable monomers include methyl acrylate, ethyl acrylate, propyl acrylate, butyl acrylate, 2-ethylhexyl acrylate, and n-octyl acrylate. One of these monomers may be used alone, or two or more of these monomers may be used in combination.

The amount of the acrylic acid ester in the acrylic acid ester-based crosslinked elastic body is preferably 50 to 99.9% by weight, more preferably 70 to 99.9% by weight, and most preferably 80 to 99.9% by weight, with respect to 100% by weight of the monomer mixture (c-1a). If the amount of the acrylic acid ester is less than 50% by weight, there are tendencies that impact resistance and tensile elongation at break are reduced and a crack easily occurs when the film is cut. If the amount of the acrylic acid ester is 100% by weight, there are tendencies that the monomer mixture (c-1b) is not copolymerized and a hard graft layer is less likely to be formed.

Examples of the other copolymerizable vinyl-based monomer in the acrylic acid ester-based crosslinked elastic body include: methacrylic acid alkyl esters (preferably, each of the methacrylic acid alkyl esters has an alkyl group with 1 to 12 carbon atoms, and the alkyl group may be either a straight-chain or branched-chain alkyl group), such as methyl methacrylate, ethyl methacrylate, propyl methacrylate, n-butyl methacrylate, isobutyl methacrylate, and t-butyl methacrylate; vinyl halides, such as vinyl chloride and vinyl bromide; vinyl cyanides, such as acrylonitrile and methacrylonitrile; vinyl esters, such as vinyl formate, vinyl acetate, and vinyl propionate; aromatic vinyl derivatives, such as styrene, vinyltoluene, and α-methylstyrene; vinylidene halides, such as vinylidene chloride and vinylidene fluoride; acrylic acid and its salts, such as acrylic acid, sodium acrylate, and calcium acrylate; acrylic acid alkyl ester derivatives, such as β-hydroxyethyl acrylate, dimethylaminoethyl acrylate, glycidyl acrylate, acrylamide, and N-methylol acrylamide; methacrylic acid and its salts, such as methacrylic acid, sodium methacrylate, and calcium methacrylate; methacrylic acid alkyl ester derivatives, such as methacrylamide, β-hydroxyethyl methacrylate, dimethylaminoethyl methacrylate, and glycidyl methacrylate; and acid anhydride derivatives, such as maleic anhydride, N-alkylmaleimide, and phenylmaleimide. One of these monomers may be used alone, or two or more of these monomers may be used in combination. Among these monomers, a methacrylic acid ester is particularly preferable in light of weatherability and transparency.

The amount of the other copolymerizable vinyl-based monomer in the acrylic acid ester-based crosslinked elastic body is preferably 0 to 49.9% by weight, more preferably 0 to 30% by weight, and most preferably 0 to 20% by weight, with respect to 100% by weight of the monomer mixture (c-1a). If the amount of the other copolymerizable vinyl-based monomer exceeds 49.9% by weight, there is a case where impact resistance and tensile elongation at break are reduced, and consequently, a crack easily occurs when the film is cut.

The polyfunctional monomer having at least two non-conjugated double bonds per copolymerizable molecule in the acrylic acid ester-based crosslinked elastic body may be a commonly-used polyfunctional monomer. Examples of the polyfunctional monomer include allyl methacrylate, allyl acrylate, triallyl cyanurate, triallyl isocyanurate, diallylphthalate, diallyl maleate, divinyl adipate, divinylbenzene, ethylene glycol dimethacrylate, diethylene glycol methacrylate, triethylene glycol dimethacrylate, trimethylolpropane trimethacrylate, tetramethylolmethane tetramethacrylate, dipropylene glycol dimethacrylate, and acrylates of these. One of these polyfunctional monomers may be used alone, or two or more of these polyfunctional monomers may be used in combination.

Not only the mean particle diameter of the acrylic acid ester-based crosslinked elastic body, but also the amount of the polyfunctional monomer having at least two non-conjugated double bonds per copolymerizable molecule in the acrylic acid ester-based crosslinked elastic body significantly affects stress whitening, tensile elongation at break, or transparency.

In one or more embodiments of the present invention, the blending amount of the polyfunctional monomer in the acrylic acid ester-based crosslinked elastic body is preferably 0.1 to 10% by weight, and more preferably 1.0 to 4% by weight, with respect to 100% by weight of the monomer mixture (c-1a). The blending amount of the polyfunctional monomer being 0.1 to 10% by weight is preferable from the viewpoints of flex cracking resistance, flex whitening resistance, and resin fluidity during molding. If the blending amount of the polyfunctional monomer is not less than 10% by weight, it may cause reduction in, for example, flex resistance and film transparency.

The acrylic elastic body graft copolymer (C-1) is preferably a product obtained by copolymerizing the monomer mixture (c-1b) containing 50 to 100% by weight of the methacrylic acid ester and 0 to 50% by weight of the other copolymerizable vinyl-based monomer with the acrylic acid ester-based crosslinked elastic body. More preferably, the acrylic elastic body graft copolymer (C-1) is a product obtained by copolymerizing (copolymerization of at least one stage) 95 to 15 parts by weight of the monomer mixture (c-1b) containing 50 to 100% by weight of a methacrylic acid alkyl ester and 0 to 50% by weight of the other copolymerizable vinyl-based monomer with 5 to 85 parts by weight of the acrylic acid ester-based crosslinked elastic body. It should be noted that the sum of the amount of the monomer mixture (c-1a) and the amount of the monomer mixture (c-1b) is 100 parts by weight.

The blending amount of the methacrylic acid alkyl ester in the monomer mixture (c-1b) is preferably not less than 80% by weight, more preferably 85% by weight, and even more preferably 90% by weight, in light of hardness and rigidity. The other copolymerizable vinyl-based monomer may be the same as the one used in the above acrylic acid ester-based crosslinked elastic body, or may be an acrylic acid alkyl ester having an alkyl group with 1 to 12 carbon atoms. Specific examples of the other copolymerizable vinyl-based monomer include methyl acrylate, ethyl acrylate, propyl acrylate, n-butyl acrylate, isobutyl acrylate, t-butyl acrylate, 2-ethylhexyl acrylate, and n-octyl acrylate. One of these monomers may be used alone, or two or more of these monomers may be used in combination.

Here, part of the monomer mixture (c-1b) (graft copolymerization composition) does not graft-react with the acrylic acid ester-based crosslinked elastic body, and as a result, an ungrafted polymer component (i.e., free polymer) is formed. This component (free polymer) can be used on the assumption that it constitutes a part or the entirety of the methacrylic polymer (C-2).

Part of the acrylic elastic body graft copolymer (C-1) (i.e., (c-1a) and grafted (c-1b)) is insoluble in methyl ethyl ketone.

The graft ratio with respect to the acrylic acid ester-based crosslinked elastic body is preferably 30 to 250%, more preferably 50 to 230%, and even more preferably 70 to 220%. If the graft ratio is less than 30%, there are tendencies that flex whitening resistance, transparency, and tensile elongation at break are reduced and a crack easily occurs when the film is cut. If the graft ratio exceeds 250%, there are tendencies that melt viscosity during film forming increases and film formability is reduced.

A method used for producing the acrylic elastic body graft copolymer (C-1) is not particularly limited, and a known method is applicable, such as emulsion polymerization, emulsion-suspension polymerization, suspension polymerization, bulk polymerization, solution polymerization, or dispersion polymerization. Among these methods, emulsion polymerization is particularly preferable since it allows a great degree of resin structure control.

The mean particle diameter d of the acrylic elastic body graft copolymer (C-1) is preferably greater than 100 nm but not greater than 400 nm, more preferably greater than 100 nm but not greater than 350 nm, and even more preferably greater than 100 nm but not greater than 300 nm. If the mean particle diameter of the acrylic elastic body graft copolymer (C-1) is not greater than 100 nm, the impact resistance and flex cracking resistance of the film tend to be reduced. If the mean particle diameter is greater than 400 nm, the transparency of the film tends to be reduced.

The mean particle diameter of the acrylic elastic body graft copolymer (C-1) herein is a value measured by a light-scattering method in a latex state by using a Microtrac particle size distribution measuring device MT3000 available from Nikkiso Co., Ltd.

Since the mean particle diameter d (nm) of the acrylic acid ester-based crosslinked elastic body in the acrylic resin, and the amount w (% by weight) of the polyfunctional monomer used in the acrylic acid ester-based crosslinked elastic body, have great influences on the stress whitening, tensile elongation at break, or transparency of the film, it is preferable that a relational expression of $0.02d \leq w \leq 0.06d$ be satisfied, and it is more preferable that a relational expression of $0.02 \leq w \leq 0.05d$ be satisfied. When the amount of the polyfunctional monomer used in the acrylic acid ester-based crosslinked elastic body is within the above ranges, the following advantages are obtained: low likelihood of the occurrence of stress whitening; low likelihood of reduction of impact resistance; low likelihood of reduction of tensile elongation at break; low likelihood of formation of a crack when the film is cut; low likelihood of reduction of transparency; and favorable film formability.

The mean particle diameter d of the acrylic acid ester-based crosslinked elastic body in the acrylic resin is preferably 50 to 200 nm, more preferably 50 to 160 nm, even more preferably 50 to 120 nm, and particularly preferably 60 to 120 nm. When the mean particle diameter d of the acrylic acid ester-based crosslinked elastic body is not less than 50 nm, impact resistance and tensile elongation at break are less likely to be reduced and a crack is less likely to occur when the film is cut. Also, when the mean particle diameter d of the acrylic acid ester-based crosslinked elastic body is not more than 200 nm, stress whitening is less likely to occur, and transparency, in particular transparency after vacuum forming, can be secured (i.e., transparency can be maintained before and after heating). Therefore, the mean particle diameter d is preferably 50 to 200 nm.

The mean particle diameter d of the acrylic acid ester-based crosslinked elastic body is a value measured based on a photograph that is taken during observation of a sample prepared by frozen ultra-thin sectioning of the obtained film, the observation being performed by using a transmission electron microscope (JEM 1200EX manufactured by JEOL Ltd.) at an acceleration voltage of 80 kV and a magnification of 40,000×.

The reduced viscosity of a component of the acrylic resin, the component being soluble in methyl ethyl ketone, is preferably 0.2 to 0.8 dl/g, more preferably 0.2 to 0.7 dl/g, and even more preferably 0.2 to 0.6 dl/g when measured under the following measurement conditions: 0.1 g of the polymer is dissolved in 100 ml of chloroform; and the measurement is performed at a temperature of 25° C. When the reduced viscosity is within the above range, the tensile elongation at break of the obtained film is less likely to be reduced, and thus a crack is less likely to occur when the film is cut. In addition, advantages such as favorable film formability are achieved.

The reduced viscosity of the component soluble in methyl ethyl ketone herein is a value obtained in the following manner: prepare a solution by dissolving the acrylic resin in methyl ethyl ketone; then based on ISO1628-1, measure the flow time of the solution and the flow time of the solvent by using a standard viscosity tube at 25° C. in a constant temperature room; and calculate the reduced viscosity by using these measured values and the concentration of the solution.

More preferably, the acrylic elastic body graft copolymer (C-1) is copolymerized with the ultraviolet absorber represented by the general formula (2) in light of ultraviolet-ray shielding capacity, retention of ultraviolet-ray shielding capacity, and low likelihood of bleeding in mold processing.

[Chem. 4]

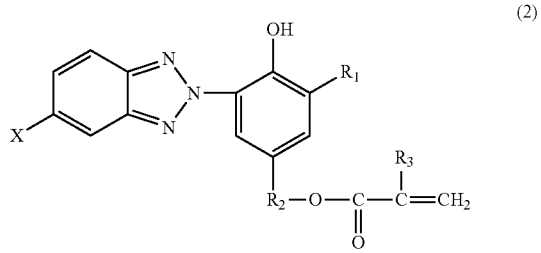

(2)

(In the general formula (2), X is H or a halogen atom; $R_1$ is H, methyl, or a t-alkyl group having 4 to 6 carbon atoms; $R_2$ is a straight-chain or branched-chain alkylene group having 2 to 10 carbon atoms; and $R_3$ is H or methyl.)

Examples of the ultraviolet absorber represented by the general formula (2) include 2-(2'-hydroxy-5'-methacryloyloxyethylphenyl)-2H-benzotriazoles, such as 2-(2'-hydroxy-5'-acryloyloxyethylphenyl)-2H-benzotriazole, 2-(2'-hydroxy-5-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, and 2-(2'-hydroxy-5'-methacryloyloxyethyl-3'-t-butylphenyl)12H-benzotriazole. Among these, 2-(2'-hydroxy-5'-methacryloyloxyethylphenyl)-2H-benzotriazole is preferable in light of costs and handleability.

The copolymerization ratio of the ultraviolet absorber represented by the general formula (2) is preferably 0.01 to 30 parts by weight, more preferably 0.01 to 25 parts by weight, even more preferably 0.01 to 20 parts by weight, and particularly preferably 0.05 to 20 parts by weight, with respect to 100 parts by weight of the acrylic elastic body graft copolymer (C-1). If the copolymerization ratio of the ultraviolet absorber represented by the general formula (2) is less than 0.01 parts by weight, there is a tendency that an effect of improving the weatherability of the obtained film is less likely to be produced. If the copolymerization ratio exceeds 30 parts by weight, there is a tendency that an effect of improving the impact resistance and flex cracking resistance of the film is less likely to be produced.

The ultraviolet absorber represented by the general formula (1) may be copolymerized in any one layer of the acrylic elastic body graft copolymer (C-1). The ultraviolet absorber is preferably copolymerized with an acrylic acid ester-based crosslinked elastic body obtained by polymerization of the monomer mixture (c-1a) and with a methacrylic acid ester-based copolymer obtained by polymerization of the monomer mixture (c-1b), and is more preferably copolymerized uniformly with the entirety of the acrylic elastic body graft copolymer (C-1).

A method used for the copolymerization of the ultraviolet absorber represented by the general formula (2) is not particularly limited, and preferably, the copolymerization is performed during the production of the acrylic elastic body graft copolymer (C-1).

As an initiator used for the polymerization of the acrylic acid ester-based crosslinked elastic body, a known initiator can be used, such as an organic peroxide, inorganic peroxide, or azo compound. Specific examples of the initiator include: organic peroxides, such as t-butyl hydroperoxide, 1,1,3,3-tetramethylbutyl hydroperoxide, succinic acid peroxide, peroxy maleic acid t-butyl ester, cumene hydroperoxide, benzoyl peroxide, formaldehyde sodium sulfoxylate, reducing sugar, and ascorbic acid; inorganic peroxides, such as potassium persulfate, sodium persulfate, and divalent iron salts; and azo compounds, such as azobisisobutyronitrile. One of these initiators may be used alone, or two or more of these initiators may be used in combination. Each of these initiators may be used as a common redox type initiator by combining each initiator with such a reductant as sodium sulfite, sodium thiosulfate, sodium formaldehyde sulfoxylate, ascorbic acid, hydroxyacetonic acid, ferrous sulfate, or a complex of ferrous sulfate and disodium ethylenediaminetetraacetic acid.

Among these, in light of polymerization stability and particle diameter control, it is preferable to use a redox type initiator that is prepared by being combined with an inorganic reductant, such as a divalent iron salt, and/or an organic reductant, such as formaldehyde sodium sulfoxylate, reducing sugar, or ascorbic acid.

The organic peroxide can be added by a known method of addition, such as a method of directly adding the organic peroxide to the polymerization system, a method of addition by mixing the organic peroxide with a monomer, or a method of addition by dispersing the organic peroxide in an aqueous emulsifying agent solution. In light of transparency, a method of addition by mixing the organic peroxide with a monomer, or a method of addition by dispersing the organic peroxide in an aqueous emulsifying agent solution, is preferable.

A surfactant used in the emulsion polymerization is not particularly limited, and any general surfactant for emulsion polymerization can be used. Examples of the surfactant include: anionic surfactants, such as sodium alkylsulfonate, sodium alkylbenzene sulfonate, sodium dioctyl sulfosuccinate, sodium lauryl sulfate, and fatty acid sodium; and non-ionic surfactants, such as reaction products resulting from a reaction of alkylphenols or aliphatic alcohols with propylene oxide and/or ethylene oxide. One of these surfactants may be used alone, or two or more of these surfactants may be used in combination. If necessary, a cationic surfactant, such as an alkylamine salt, may be used.

The obtained acrylic elastic body graft copolymer (C-1) latex is subjected to usual operations such as coagulation, washing, and drying, or to treatment such as spray drying or lyophilization. As a result, the resin composition is separated and collected.

A methacrylic acid ester-based polymer, or a copolymer obtained by copolymerizing a methacrylic acid ester with another copolymerizable vinyl-based monomer, can be used as the methacrylic polymer (C-2). Preferably, a copolymerization product of a monomer mixture containing 80 to 100% by weight of a methacrylic acid ester and 0 to 20% by weight of another copolymerizable vinyl-based monomer can be used.

From the viewpoints of the hardness and rigidity of the obtained film, the blending amount of the methacrylic acid ester is more preferably not less than 85% by weight, and even more preferably not less than 90% by weight.

As the methacrylic acid ester, a methacrylic acid alkyl ester is preferable, and in light of availability with ease, methyl methacrylate is more preferable.

As the other copolymerizable vinyl-based monomer in the methacrylic polymer (C-2), those usable in the acrylic elastic body graft copolymer (C-1) may be exemplified. One of those monomers may be used alone, or two or more thereof may be used in combination.

It is also possible to polymerize the methacrylic polymer (C-2) separately from the acrylic elastic body graft copolymer (C-1). Also in such a case, the polymerization method is not particularly limited, and a known polymerization method is applicable, such as emulsion polymerization, emulsification-suspension polymerization, suspension polymerization, bulk polymerization, or solution polymerization.

The mean particle diameter of the methacrylic polymer (C-2) is preferably 100 to 500 µm, and more preferably 100 to 300 µm. If the mean particle diameter of the methacrylic polymer (C-2) is less than 100 µm, impact resistance, flex cracking resistance, and chemical resistance tend to be reduced. If the mean particle diameter exceeds 500 µm, transparency tends to be reduced.

The mean particle diameter of the methacrylic polymer (C-2) is a value measured by a light-scattering method in a latex state by using a Microtrac particle size distribution measuring device MT3000 available from Nikkiso Co., Ltd.

As an initiator used for the polymerization of the methacrylic polymer (C-2), a known initiator can be used, such as an organic peroxide, inorganic peroxide, or azo compound, which are the same as the initiators usable for the polymerization of the monomer mixture (c-1a) in the production of the above-described acrylic acid ester-based crosslinked elastic body. One of these initiators may be used alone, or two or more of these initiators may be used in combination.

The organic peroxide can be added by a known method of addition, such as a method of directly adding the organic peroxide to the polymerization system, a method of addition by mixing the organic peroxide with a monomer, or a method of addition by dispersing the organic peroxide in an aqueous emulsifying agent solution. In light of transparency, a method of addition by mixing the organic peroxide with a monomer is preferable.

A dispersant used in the suspension polymerization may be a commonly-used dispersant for suspension polymerization. Examples of such a dispersant include: polymeric dispersants, such as polyvinyl alcohol, polyvinyl pyrrolidone, and polyacrylamide; and poorly water-soluble inorganic salts, such as calcium phosphate, hydroxyapatite, and magnesium pyrophosphate. In the case of using a poorly water-soluble inorganic salt, it is effective to use an anionic surfactant, such as sodium α-olefin sulfonate or sodium dodecylbenzenesulfonate, together with the poorly water-soluble inorganic salt since the dispersion stability is enhanced thereby. Any of these dispersants may be added once or more during the polymerization in order to adjust the diameter of the obtained resin particles.

The acrylic acid-based ester crosslinked elastic body content in the acrylic resin is preferably 5 to 100% by weight, more preferably 5 to 45% by weight, and even more preferably 10 to 30% by weight. It should be noted that the sum of the amount of the acrylic elastic body graft copolymer (C-1) and the amount of the methacrylic polymer (C-2) is 100% by weight. When the acrylic elastic body graft copolymer (C-1) content is 5% by weight or more, there are tendencies that the tensile elongation at break of the obtained film is less likely to be reduced and a crack is less likely to occur when the film is cut, and also, stress whitening is less likely to occur. When the acrylic elastic body graft copolymer (C-1) content is 5 to 45% by weight, the hardness and rigidity of the obtained film tend to be more favorable.

In one or more embodiments, a film obtained by laminating a fluorine-based resin layer of the present invention on a base film has a total thickness of preferably 30 to 300 µm, or more preferably 30 to 200 µm. If the film obtained by laminating the fluorine-based resin layer on the base film has a total thickness of less than 30 µm, there are tendencies that mold processability in forming the film is reduced and wrinkles are easily formed when the film is rolled up. If the film obtained by laminating the fluorine-based resin layer on the base film has a total thickness of more than 300 µm, there are tendencies that the transparency of the film is reduced, and also, secondary processability is reduced.

In one or more embodiments, in a film obtained by laminating a fluorine-based resin layer of the present invention on a base film, the thickness of the base film is preferably 1 to 30 µm, more preferably 5 to 30 µm, and even more preferably 5 to 20 µm. If the thickness of the base film layer is less than 1 µm, there are tendencies that sufficient weatherability, chemical resistance, and stain resistance are not achieved, and also, formability is reduced. If the thickness of the base film layer exceeds 30 µm, it is disadvantageous in terms of costs, and also, the film transparency and formability tend to be reduced.

In one or more embodiments of the present invention, an adhesion layer in which a suitable adhesive or an adhesive resin is used may be provided between the base film layer and the acrylic resin film layer for the purpose of lamination.

As the adhesive or adhesive resin, a known one can be used, for example, a (meth)acrylic acid alkyl ester based resin, a copolymer thereof, a styrene-butadiene copolymer, a rubber such as a polyisoprene rubber or a polyisobutylene rubber, a polyvinyl ether-based, silicone-based, maleimide-based or cyano acrylate-based resin, a halogenated vinylidene resin such as vinylidene chloride or vinylidene fluoride, as well as a mixture of any of these with a fluorine-based (meth)acrylic resin containing a fluorine-containing alkyl (meth)acrylate polymer component or with a (meth)acrylic acid alkyl ester-based resin. From the viewpoints of weatherability and transparency, a (meth)acrylic acid alkyl ester-based resin that is a copolymer whose major component is a (meth)acrylic acid alkyl ester monomer is preferable. These may be used either alone, or used as an adhesive composition after being blended with a crosslinking agent or a tackifier.

The (meth)acrylic acid alkyl ester-based resin is an alkyl ester of acrylic acid or methacrylic acid, and is not particularly limited. Examples of the (meth)acrylic acid alkyl ester-based resin include methyl acrylate, ethyl acrylate, isopropyl acrylate, n-butyl acrylate, isobutyl acrylate, pentyl (meth)acrylate, 2-ethylhexyl (meth)acrylate, isooctyl (meth)acrylate, isononyl (meth)acrylate, decyl (meth)acrylate, and lauryl (meth)acrylate.

A method used for forming the adhesion layer may be the same as the above-described method of forming the fluorine-based resin laminated acrylic resin film.

In one or more embodiments, a haze value of a fluorine-based resin laminated acrylic resin film of the present invention is preferably not more than 2.0, and more preferably not more than 1.5, from the viewpoint of its appearance when used for automobile interior components.

The haze value herein is a value measured in conformity with JIS K6714 under the conditions of a temperature of 23±2° C. and a humidity of 50±5% with a film thickness of 75 µm.

The fluorine-based resin film and the fluorine-based resin laminated acrylic resin film of one or more embodiments of the present invention are preferably used for vehicles and building materials. Specific examples of their applicable use include: use in interior components of an automobile, such as an instrument panel, console box, meter cover, door lock bezel, steering wheel, power window switch base, center cluster, and a dashboard; use in exterior components of an automobile, such as a weather strip, bumper, bumper guard, side mud guard, body panel, spoiler, front grill, strut mount, wheel cover, center pillar, door mirror, center ornament, side molding, door garnish molding, window molding, window, head lamp cover, tail lamp cover, and windshield parts; use in, for example, a front panel, buttons, an emblem, and a surface decoration material of audio-visual equipment or a furniture product; use in, for example, a housing, a display window, and buttons of a mobile phone or the like; use in exterior materials for furniture; use in architectural interior materials, such as a wall surface, a ceiling, and a floor; use in architectural exterior materials, such as an outer wall (e.g., siding), fence, roof, gate, and a bargeboard; use in surface decoration materials for housing components, such as a window frame, door, handrail sill, and a door header, use in optical members, such as various types of displays, lenses, mirrors, goggles, and window glasses; and use in the interior and exterior of various types of vehicles other than automobiles, such as electric railcars, aircrafts, and ships and vessels.

Among the above, particularly in the case of performing the lamination onto a vehicle interior or exterior component, the surface of the component after completing the lamination is preferably a fluorine-based resin film layer, and an adhesion layer adhered to the component is an acrylic resin film layer. Although the lamination method is not particularly limited, it is preferable to adopt a film in-mold forming method or film insert molding method, such as one of those described in Japanese Examined Patent Application Publication No. S63-6339, Japanese Examined Patent Application Publication No. H04-9647, Japanese Laid-Open Patent Application Publication No. H07-9484, Japanese Laid-Open Patent Application Publication No. H08-323934, and Japanese Laid-Open Patent Application Publication No. H10-279766. To be specific, preferably, a film shaped or not shaped beforehand by vacuum forming or the like is inserted between injection molding dies, and the dies are closed with the film sandwiched therebetween for mold clamping, and in such a state, injection molding of a base resin is performed to allow the film to be melt integrated on the surface of the molded product of the injected base resin. At the time, injection conditions such as a resin temperature and injection pressure are suitably set by taking account of, for example, the type of the base resin.

EXAMPLES

Hereinafter, the present invention is described in more detail based on examples. However, the present invention is not limited to these examples.

In Production Examples, Examples, and Comparative Examples described below, terms "part(s)" and "%" refer to "part(s) by weight" and "% by weight", respectively.

Physical property measurement methods used in Examples and Comparative Examples described below are as follows.

(Method of Measuring Particle Diameter of Acrylic Acid Ester-Based Crosslinked Elastic Body Particles)

A photograph of the obtained film was taken by using a transmission electron microscope (JEM-1200EX manufactured by JEOL, Ltd.) at an acceleration voltage of 80 kV while adopting a RuO4-stained ultra-thin sectioning method. Then, 100 images of acrylic acid ester-based crosslinked elastic body particles were randomly selected from the obtained photograph, and the average value of the particle diameters thereof was determined.

(Method of Measuring Particle Diameter of Fluorine-Containing Acrylic Resin and Acrylic Elastic Body Graft Copolymer (C-1))

Particle diameter measurement was performed in a latex state with a light-scattering method by using a Microtrac particle size distribution measuring device MT3000 available from Nikkiso Co., Ltd. In a case where the resin production was performed by suspension polymerization, the measurement was performed in a slurry state by using a Microtrac particle size distribution measuring device 9210SRA/9220FRA available from Nikkiso Co., Ltd.

(Evaluation of Transparency)

For evaluation of the transparency of the obtained film, the haze value was measured in conformity with JIS K6714 under the conditions of a temperature of 23±2° C. and a humidity of 50±5%.

(Evaluation of Chemical Resistance)

<Xylene Resistance>

One drop (0.02 g) of xylene was dripped on the obtained film, and alteration of the film was evaluated by visual observation.

Good: No alternation was found.

Not so good: Fine trace of the drop was found.

Poor: Significant degradation of the surface and distinct trace of the drop were found.

(Evaluation of Stain Resistance)

<Resistance to Sunscreen [Resistance to Coppertone (Registered Trademark)] (Test Method 1)>

A small amount of a sunscreen (Coppertone Water Babies lotion SPF50) was applied onto the obtained film, and gauze was put thereon, followed by the application of a load of 500 g. After being left as it was at room temperature for one hour, the film was heated in an oven at 54° C. or 64° C. for one hour. Thereafter, the applied sunscreen was wiped off with gauze, and the film was washed with water. Then, alteration of the sunscreen-applied portion was evaluated by visual observation.

Good: No alternation was found.

Not so good: Fine trace of the application was found.

Poor: Significant degradation of the surface and distinct trace of the application were found.

<Resistance to Sunscreen [Resistance to Coppertone (Registered Trademark)] (Test Method 2)>

One drop (0.005 g) of a sunscreen (Coppertone Water Babies Lotion SPF50) was dripped on the obtained film, and spread over a region of 2×3 cm by using a brush. After being left as it was at 70° C., 80° C., or 90° C. for 24 hours, the applied sunscreen was wiped off with gauze, and the film was washed with water. Then, alteration of the sunscreen-applied portion was evaluated by visual observation.

Good: No alternation was found.
Not so good: Fine trace of the application was found.
Poor: Significant degradation of the surface and distinct trace of the application were found.

<Evaluation of Lactic Acid Resistance>

One drop of a 10% aqueous lactic acid solution was dripped on the obtained film, which was left as it was under the condition of a temperature of 80° C. for 24 hours. Thereafter, the film was washed with water, and alteration of the film was evaluated by visual observation.
Good: No alternation was found.
Not so good: Fine trace of dissolution in a pinhole pattern was found.
Poor: Significant degradation of the surface and distinct trace of dissolution were found.

(Evaluation of Flex Cracking Resistance)

The obtained film was bent once by 180°, and alteration at the bent portion was evaluated by visual observation.
Good: No breakage was found.
Not so good: Slight breakage occurred.
Poor: Film was broken and completely fractured.

(Evaluation of Flex Whitening Resistance)

The obtained film was bent once by 180° and alteration at the bent portion was evaluated by visual observation.
Good: No whitening was found.
Not so good: Slight whitening was found when light was transmitted through the film.
Poor: Whitening was clearly visible.

(Evaluation of Surface Hardness)

The surface hardness of the obtained film was measured and evaluated by performing a pencil hardness test in conformity with JIS K5600-5-4.

(Evaluation of Film Productivity)

<Evaluation of Continuous Productivity of Single-Layer Film: (Evaluation Method 1)>

Melt extrusion molding of a single-layer film was continuously performed for two hours, and the operation status was observed to make evaluation based on criteria indicated below. Fluorine-containing acrylic resin pellets or acrylic resin pellets were melt-kneaded by using a 40 mm diameter single screw extruder equipped with a T-die whose cylinder temperature was set to 180 to 240° C. and discharge rate was set to 10 kg/hr, and melt extrusion molding of a single-layer resin film with a thickness of 125 μm was performed at a die temperature of 240° C.
Good: Film was successfully produced with no occurrence of appearance defects, such as foaming or stripes (die lines).
Poor: Film production was unsuccessful due to the occurrence of appearance defects, such as foaming or stripes (die lines).

<Evaluation of Continuous Productivity of Laminated Film: (Evaluation Method 2)>

Melt coextrusion molding of a laminated film was continuously performed for two hours, and the operation status was observed to make evaluation based on criteria indicated below. A two-type/two-layer T die (feed block system) was used in the coextrusion. As the extruder on the base film resin side, a 40 mm diameter single screw extruder was used, and melt kneading was performed with a cylinder temperature set to 200 to 260° C. and a discharge rate set to 5 to 15 kg/hr. On the other hand, as the extruder on the fluorine-containing acrylic resin side, a 32 mm diameter single screw extruder was used, and melt kneading was performed with a cylinder temperature set to 180 to 240° C. and a discharge rate set to 0.5 to 3 kg/hr. The molten resin was charged into the die having a die temperature set to 240° C., and thus the melt coextrusion molding of a laminated film was performed.
Good: Film was successfully produced with no occurrence of appearance defects, such as foaming or stripes (die lines).
Poor: Film production was unsuccessful due to the occurrence of appearance defects, such as foaming or stripes (die lines).

<Evaluation of Continuous Productivity of Laminated Film: (Evaluation Method 3)>

Wet coating of a laminated film was continuously performed for two hours, and the operation status was observed to make evaluation based on criteria indicated below. The wet coating was performed in the following manner: a coating solution was prepared by dissolving a fluorine-based (meth)acrylic resin in methyl isobutyl ketone; a coating was formed on a base film with the coating solution by wet coating using a particular bar coater; and thereafter, the resulting film was dried at a temperature of 80° C. for two minutes in a dry pass box.
Good: Film was successfully produced with no occurrence of appearance defects, such as foaming or stripes (die lines).
Poor: Film production was unsuccessful due to the occurrence of appearance defects, such as foaming or stripes (die lines).

<Melt Viscosity>

The melt viscosity of the obtained fluorine-containing acrylic resin was measured under conditions conforming to JIS K7199 (a die temperature of 220° C., a shear rate of 122 sec$^{-1}$, and a capillary die diameter of 1 mm).

<Reduced Viscosity>

The reduced viscosity of the obtained fluorine-containing acrylic resin was measured based on ISO1628-1 in the following manner: the flow time of a solution and the flow time of its solvent were measured by using a standard viscosity tube at 25° C. in a constant temperature room; and the reduced viscosity of the fluorine-containing acrylic resin was calculated by using these measured values and the concentration of the solution. The solution was prepared by dissolving 0.1 g of the polymer in 100 ml of a chloroform solvent or a methyl ethyl ketone solvent.

<Melt Viscosity Reduction Rate>

A melt viscosity value of the obtained fluorine-containing acrylic resin, the melt viscosity value being measured under conditions conforming to JIS K7199 (a die temperature of 230° C., a shear rate of 24 sec$^{-1}$, a capillary die diameter of 1 mm, and a residence time of 1 hour) was compared with another melt viscosity value of the obtained fluorine-containing acrylic resin, the other melt viscosity value being measured under the conditions of the same die temperature and the same shear rate but a residence time of 10 minutes. Based on the comparison, a reduction rate (%) of the melt viscosity was calculated by using an equation shown below.

Melt viscosity reduction rate (%)=residence time (melt viscosity in the case of residence time being 10 minutes−melt viscosity in the case of residence time being 1 hour)/(melt viscosity in the case of residence time being 10 minutes)× 100(%)

(Evaluation of Glass-Transition Temperature)

The glass-transition temperature of the fluorine-containing acrylic resin was measured in conformity with a method stipulated by JIS K7121. It should be noted that a solution used in the measurement was prepared by using a deaerated and dried solvent.

(Water Contact Angle Measurement at Temperature of 80° C.)

A contact angle meter FACE manufactured by Kyowa Interface Science Co., LTD. was used to measure a water contact angle. The temperature of a sample stand was set to 80° C., and while 0.4 ml of a water droplet was exposed from a syringe needle tip, the sample stand was lifted to bring the water droplet into contact with a sample. When 10 seconds elapsed after the water droplet had come into contact with the sample, the water contact angle was measured.

(Number-Average Molecular Weight of Resin)

The number-average molecular weight of the resin in terms of polystyrene was measured by using HLC8220GPC (manufactured by TOSOH CORPORATION). In the measurement, TSKgel Super H5000, H4000, and H3000 (manufactured by TOSOH CORPORATION) were connected together and used as a GPC column, and THF (containing a stabilizer) was used as a solvent. The other conditions were as follows: a measurement temperature was an inlet oven temperature of 40° C.; a sample amount was 10 μl; a liquid amount was 0.6 ml/min; and a detector was an RI detector.

Production Example 1

<Fluorine-Containing Acrylic Resin (A-1)>

In a dispersion vessel, 300 parts of deionized water and 1 part of polyvinyl alcohol were mixed. Separately, a monomer solution containing 90 parts of 2,2,2-trifluoroethyl methacrylate, 10 parts of methyl methacrylate, 0.5 parts of 2,2'-azobis(2-methyl butyronitrile), and 0.06 parts of 2-ethylhexyl thioglycolate was prepared and added into the above dispersion vessel. The resulting liquid mixture was subjected to dispersion treatment by using a homomixer to obtain a dispersion liquid having a droplet diameter adjusted to 100 nm.

This dispersion liquid was charged into an 8 L polymerization reactor equipped with a stirrer, a thermometer, a reflux condenser, and a nitrogen gas introducing port, and a polymerization reaction was caused for three hours at a liquid temperature of 80 to 90° C. while stirring the dispersion liquid under a nitrogen air stream of 70° C.

The resulting dispersion liquid of polymer particles was filtered, washed, and dried to obtain a spherical organic fine particle powder of poly(2,2,2-trifluoroethyl methacrylate) (having a mean particle diameter of 100 μm) as a fluorine-containing acrylic resin (A-1).

Then, 100 parts of the obtained fluorine-containing acrylic resin (A-1) was melt-kneaded by using a 40 mm diameter single screw extruder (manufactured by Osaka Seiki Kousaku K. K.) with its settings adjusted to a cylinder temperature of 200° C., a screw rotation speed of 75 rpm, and a discharge rate of 10 kg/hr, and taken out of the extruder to be a strand. The strand was cooled down in a water tank, and then cut by using a pelletizer to obtain pellets. In this manner, fluorine-containing acrylic resin pellets (A-1P) were produced.

The obtained spherical organic fine particle powder (having a mean particle diameter of 100 μm) of the fluorine-containing acrylic resin (A-1) was dissolved in methyl isobutyl ketone to obtain a solution (A-1L) having a solid concentration of 20%. The number-average molecular weight of the obtained polymer was measured by GPC and confirmed to be 210,000. The melt viscosity reduction rate of the obtained fluorine-containing acrylic resin pellets (A-1P) was 41%.

Production Example 2

<Fluorine-Containing Acrylic Resin (A-2)>

First, 83 parts of methyl isobutyl ketone was charged into a reactor equipped with a stirrer, a thermometer, a reflux condenser, a nitrogen gas introducing tube, and a dripping funnel, and then the reactor was heated to 85° C. while introducing nitrogen gas into the reactor. Thereafter, a mixture of 90 parts of 2,2,2-trifluoroethyl methacrylate, 10 parts of methyl methacrylate, and 0.5 parts of 2,2'-azobis (2-methyl butyronitrile) was dripped from the dripping funnel into the reactor at a constant speed for five hours. Next, a mixed solution of 0.2 parts of 2,2'-azobis(2-methyl butyronitrile) and 35 parts of methyl isobutyl ketone was dripped into the reactor at a constant speed for one hour. Thereafter, the mixture in the reactor was stirred for two hours at 105° C., and then cooled down to 50° C. In this manner, a polymer (fluorine-containing acrylic resin) (A-2L) was synthesized. The concentration of the solid content (A-2) in the obtained polymerized fluorine-containing acrylic resin was 45%, and the number-average molecular weight measured by GPC was 50,000. Further, the polymerized fluorine-containing acrylic resin (A-2) was deaerated under reduced pressure by an evaporator, and thereby methyl isobutyl ketone was removed. Thereafter, pellets (A-2P) were obtained by performing the same operations as those of Production Example 1. The melt viscosity reduction rate of the obtained pellets (A-2P) was 47%.

Production Example 3

<Fluorine-Containing Acrylic Resin (A-3)>

A spherical organic fine particle powder (having a mean particle diameter of 100 μm) of a fluorine-containing acrylic resin (A-3) was obtained by performing the same operations as those of Production Example 1, except that 10 parts of methyl methacrylate used in Production Example 1 was replaced by 10 parts of butyl acrylate. Then, 100 parts of the obtained fluorine-containing acrylic resin (A-3) was used to produce fluorine-containing acrylic resin pellets (A-3P) in the same manner as in Production Example 1.

The obtained spherical organic fine particle powder (having a mean particle diameter of 100 μm) of the fluorine-containing alkyl (meth)acrylate polymer (A-3) was dissolved in methyl isobutyl ketone to obtain a solution (A-3L) having a solid concentration of 20%. The number-average molecular weight of the obtained polymer was measured by GPC and confirmed to be 200,000. The melt viscosity reduction rate of the obtained fluorine-containing acrylic resin pellets (A-3P) was 10%.

Production Example 4

<Fluorine-Containing Acrylic Resin (A-4)>

A polymer (A-4L) was obtained by performing the same operations as those of Production Example 2, except that 90 parts of 2,2,2-trifluoroethyl methacrylate and 10 parts of methyl methacrylate in Production Example 2 were replaced by 70 parts of 2,2,2-trifluoroethyl methacrylate and 30 parts of methyl methacrylate. The concentration of the solid content (A-4) in the obtained polymer (A-4L) was 45%, and the number-average molecular weight measured by GPC was 50,000. Further, the polymerized fluorine-containing acrylic resin (A-4) was deaerated under reduced pressure by an evaporator, and thereby methyl isobutyl ketone was removed. Thereafter, pellets (A-4P) were obtained by performing the same operations as those of Production Example 1. The melt viscosity reduction rate of the obtained pellets (A-4P) was 47%.

Production Example 5

<Fluorine-Containing Acrylic Resin (A-5)>
A polymer (A-5L) was obtained by performing the same operations as those of Production Example 2, except that 90 parts of 2,2,2-trifluoroethyl methacrylate and 10 parts of methyl methacrylate in Production Example 2 were replaced by 40 parts of 2,2,2-trifluoroethyl methacrylate and 60 parts of methyl methacrylate. The concentration of the solid content (A-5) in the obtained polymer (A-5L) was 45%, and the number-average molecular weight measured by GPC was 50,000.

Production Example 6

<Fluorine-Containing Acrylic Resin (A-6)>
A fluorine-containing alkyl (meth)acrylate polymer (A-6L) was obtained by performing the same operations as those of Production Example 2, except that 90 parts of 2,2,2-trifluoroethyl methacrylate and 10 parts of methyl methacrylate in Production Example 2 were replaced by 90 parts of 2-(perfluorohexyl)ethyl methacrylate and 10 parts of methyl methacrylate. The concentration of the solid content (A-6) in the obtained polymer (A-6L) was 45%, and the number-average molecular weight measured by GPC was 50,000.

(Production Example 7) Acrylic Resin (C-1)

<Acrylic Elastic Body Graft Copolymer (C1-1)>
Substances indicated below were charged into an 8 L polymerizer equipped with a stirrer.
Deionized water: 200 parts
Sodium dioctyl sulfosuccinate: 0.25 parts
Sodium formaldehyde sulfoxylate: 0.15 parts
Disodium ethylenediaminetetraacetic acid: 0.001 parts
Ferrous sulfate: 0.00025 parts
The polymerizer was sufficiently purged with nitrogen gas, such that substantially no oxygen was present therein. Thereafter, the internal temperature of the polymerizer was set to 60° C., and a mixture containing 30 parts of a monomer mixture (c1-1a) described below and 0.5 parts of 2-(2'-hydroxy-5'-methacryloyloxyethylphenyl)-2-H-benzotriazole (RUVA-93 manufactured by Otsuka Chemical Co., Ltd.) was continuously added into the polymerizer at a rate of 10 parts by weight/hr. After the addition was completed, polymerization was further continued for 0.5 hours. As a result, acrylic acid ester-based crosslinked elastic body particles (having a mean particle diameter d=60 nm) were obtained. The polymerization conversion rate was 99.5%. The monomer mixture (c1-1a) contains:

| | |
|---|---|
| a vinyl-based monomer mixture (containing 90% of butyl acrylate (BA) and 10% of methyl methacrylate (MMA)) | 100 parts; |
| allyl methacrylate (AlMA) | 1 part; and |
| cumene hydroperoxide (CHP) | 0.2 parts. |

Thereafter, 0.05 parts by weight of sodium dioctyl sulfosuccinate was charged into the polymerizer. Then, the internal temperature of the polymerizer was set to 60° C., and 70 parts of a monomer mixture (c1-1b) containing 100 parts of a vinyl-based monomer mixture (containing 10% of BA and 90% of MMA), 0.5 parts of tertiary dodecyl mercaptan (t-DM), and 0.5 parts of CHP was continuously added into the polymerizer at a rate of 10 parts/hr. After the addition was completed, polymerization was further continued for one hour. As a result, an acrylic elastic body graft copolymer (C1-1) (having a mean particle diameter=180 μm) was obtained. The polymerization conversion rate was 98.2%. The obtained latex was subjected to salting-out with calcium chloride, coagulated, washed with water, and dried to obtain a resin powder (C1-1).

<Methacrylic Polymer (C1-2)>
As a methacrylic polymer (C1-2), a methyl methacrylate/methyl acrylate copolymer (SUMIPEX LG in the form of beads; manufactured by Sumitomo Chemical Company, Limited.) was used.

<Acrylic Resin (C-1)>
After mixing 25 parts of the acrylic elastic body graft copolymer (C1-1) obtained as described above and 75 parts of the methacrylic polymer (C1-2) by using a Henschel mixer, the mixture was melt-kneaded by using a 40 mm diameter single screw extruder (manufactured by Osaka Seiki Kousaku K. K.) with its settings adjusted to a cylinder temperature of 200 to 260° C., a screw rotation speed of 90 rpm, and a discharge rate of 15 kg/hr, and taken out of the extruder to be a strand. The strand was cooled down in a water tank, and then cut by using a pelletizer to obtain pellets. In this manner, acrylic resin pellets (C-1P) were produced.

(Production Example 8) Acrylic Resin (C-2)

<Acrylic Elastic Body Graft Copolymer (C2-1)>
Substances indicated below were charged into an 8 L polymerizer equipped with a stirrer, a thermometer, a nitrogen gas introducing tube, a monomer supplying tube, and a reflux condenser.
Water (ion-exchanged water): 200 parts
Sodium formaldehyde sulfoxylate: 0.15 parts
Ferrous sulfate dihydrate: 0.0015 parts
Disodium ethylenediaminetetraacetic acid: 0.006 parts
Sodium dioctyl sulfosuccinate: 0.0015 parts
The polymerizer was sufficiently purged with nitrogen gas, such that substantially no oxygen was present therein. Thereafter, the internal temperature of the polymerizer was set to 60° C., and 50 parts of a monomer mixture (c2-1a) containing 100 parts of a vinyl-based monomer mixture (containing 84% of BA, 8% of MMA, and 8% of styrene (ST)), 1 part of AlMA, and 0.1 parts of CHP was continuously added into the polymerizer at a rate of 15 parts/hr. After the addition was completed, polymerization was further continued for one hour. As a result, acrylic acid ester-based crosslinked elastic body particles (having a mean particle diameter d=210 nm) were obtained. The polymerization conversion rate was 98.5%.

Thereafter, 0.05 parts of sodium dioctyl sulfosuccinate was charged into the polymerizer. Then, the internal temperature of the polymerizer was set to 60° C., and 50 parts of a monomer mixture (c2-1b) containing 100 parts of a vinyl-based monomer mixture (containing 90% of MMA and 10% of BA), 0.2 parts of t-DM, and 0.1 parts of CHP was continuously added into the polymerizer at a rate of 10 parts/hr. After the addition was completed, polymerization was further continued for one hour. As a result, an acrylic elastic body graft copolymer (C2-1) (having a mean particle diameter=200 μm) was obtained. The polymerization conversion rate was 99.0%. The obtained latex was subjected to salting-out with calcium chloride, coagulated, washed with water, and dried to obtain a resin powder (C2-1).

<Methacrylic Polymer (C2-2)>

As a methacrylic polymer (C2-2), a methyl methacrylate/methyl acrylate copolymer (SUMIPEX EX in the form of beads; manufactured by Sumitomo Chemical Company, Limited.) was used.

<Acrylic Resin (C-2)>

Acrylic resin pellets (C-2P) were produced in the same manner as in Production Example 7, except that after 25 parts of the acrylic elastic body graft copolymer (C2-1) obtained as described above, 75 parts of the methacrylic polymer (C2-2) obtained as described above, and 1.0 part of Tinuvin 234 (manufactured by Ciba Japan K.K.) as an ultraviolet absorber were mixed together by using a Henschel mixer, the cylinder temperature was adjusted to 240° C.

Fluororesin Laminated Film Fabrication 1

Example 1

The acrylic resin pellets (C-2P) obtained in Production Example 8 were melt-kneaded by using a 40 mm diameter single screw extruder equipped with a T-die with its settings adjusted to a cylinder temperature of 180 to 240° C., a discharge rate of 10 kg/hr, and a die temperature of 240° C., and thereby a single-layer resin film with a thickness of 69 μm was obtained. A coating was formed on the obtained acrylic resin film with the solution (A-1L) containing 20% of the fluorine-containing acrylic resin by using a No. 16 bar coater. After the coating was formed, the film was set for 30 seconds at room temperature and then dried at 80° C. for two minutes by a dryer. Consequently, the thickness of the surface layer resin was 6 μm, and the total thickness of the film was 75 μm. Results of evaluation of the obtained film are shown in Table 1.

Example 2

A laminated resin film having a surface layer resin thickness of 6 μm and a total film thickness of 75 μm was obtained by performing the same operations as those of Example 1, except that the coating was formed by using a No. 8 bar coater with the solution (A-2L) containing 45% of the fluorine-containing acrylic resin obtained in Production Example 2. Results of evaluation on the obtained film are shown in Table 1.

Example 3

A laminated resin film having a surface layer resin thickness of 6 μm and a total film thickness of 75 μm was obtained by performing the same operations as those of Example 2, except that the coating was formed with the solution (A-4L) containing 45% of the fluorine-containing acrylic resin obtained in Production Example 4. Results of evaluation on the obtained film are shown in Table 1.

Example 4

The acrylic resin pellets (C-1P) obtained in Production Example 7 were melt-kneaded by using a 40 mm diameter single screw extruder equipped with a T-die with its settings adjusted to a cylinder temperature of 180 to 240° C., a discharge rate of 10 kg/hr, and a die temperature of 240° C., and thereby a single-layer resin film with a thickness of 69 μm was obtained. A coating was formed on the obtained acrylic resin film with the solution (A-2L) containing 45% of the fluorine-based (meth)acrylic resin by using a No. 8 bar coater. After the coating was formed, the film was set for 30 seconds at room temperature and then dried at 80° C. for two minutes by a dryer. Consequently, the thickness of the surface layer resin was 6 μm, and the total thickness of the film was 75 μm. Results of evaluation of the obtained film are shown in Table 1.

Example 5

A laminated resin film having a surface layer resin thickness of 3 μm and a total film thickness of 75 μm was obtained by performing the same operations as those of Example 2, except that the coating was formed by using a No. 8 bar coater with the solution (A-1L) containing 20% of the fluorine-based (meth)acrylic resin obtained in Production Example 1. Results of evaluation on the obtained film are shown in Table 1.

As shown in Table 1, a fluorine-based resin single-layer film of the present invention, in which a methacrylate-based monomer having low thermal decomposition resistance is used, realizes both a sufficient water contact angle (for achieving water repellency) at 80° C. and favorable film productivity, because the lamination by wet coating eliminates resin thermal decomposition.

It is understood from the comparison with Comparative Examples 1 to 6 that owing to the resin's high glass-transition temperature and water repellency at high temperatures, the lactic acid resistance of the film is kept even when the surface layer is made thinner, and also, transparency with excellent film appearance and favorable film productivity are realized. It is also understood that a film of the present invention is well-balanced in terms of chemical resistance, lactic acid resistance, stain resistance to sunscreens, transparency, and film productivity, and is optimally applicable to automobile interior and exterior components.

Comparative Example 1

The acrylic resin pellets (C-2) obtained in Production Example 8 were melt-kneaded by using a 40 mm diameter single screw extruder equipped with a T-die with its settings adjusted to a cylinder temperature of 180 to 240° C., a discharge rate of 10 kg/hr, and a die temperature of 240° C., and thereby a single-layer resin film with a thickness of 69 μm was obtained. A coating was formed on the obtained acrylic resin film with the solution (A-3L) containing 45% of the fluorine-based (meth)acrylic resin by using a No. 8 bar coater. After the coating was formed, the film was set for 30 seconds at room temperature and then dried at 80° C. for two minutes by a dryer. Consequently, the thickness of the surface layer resin was 6 μm, and the total film thickness was 75 μm. Results of evaluation of the obtained film are shown in Table 1.

Comparative Example 2

A laminated resin film having a surface layer resin thickness of 6 μm and a total film thickness of 75 μm was obtained by performing the same operations as those of Example 1, except that the coating was formed with the solution (A-5L) containing 45% of the fluorine-containing acrylic resin obtained in Production Example 5. Results of evaluation on the obtained film are shown in Table 1.

Comparative Example 3

A laminated resin film having a surface layer resin thickness of 6 μm and a total film thickness of 75 μm was obtained by performing the same operations as those of Example 1, except that the coating was formed with the solution (A-6L) containing 45% of the fluorine-based (meth) acrylic resin obtained in Production Example 6. Results of evaluation on the obtained film are shown in Table 1.

Fluororesin Laminated Film Fabrication 2

Comparative Example 4

The acrylic resin pellets (C-2) obtained in Production Example 8 were used as a base resin, and the fluorine-containing acrylic resin pellets (A-1P) obtained in Production Example 1 were used as a surface layer resin in a coextrusion method described below. As a result, a laminated film with a total film thickness of 75 μm (a base resin layer of 69 μm and a surface resin layer of 6 μm) was obtained.

A two-type/two-layer T die (feed block system) was used in the coextrusion. As the extruder on the acrylic resin side, a 40 mm diameter single screw extruder was used, and melt kneading was performed with a cylinder temperature set to 200 to 260° C. and a discharge rate set to 5 to 15 kg/hr. On the other hand, as the extruder on the fluorine-based (meth) acrylic resin side, a 32 mm diameter single screw extruder was used, and melt kneading was performed with a cylinder temperature set to 180 to 240° C. and a discharge rate set to 0.5 to 3 kg/hr. The molten resin was charged into the die having a die temperature set to 240° C., and thus a laminated film was obtained. Results of evaluation on the obtained film are shown in Table 1.

Comparative Example 5

A single-layer resin film having a total film thickness of 75 μm was obtained by performing the same operations as those of Comparative Example 4, except that the acrylic resin pellets (C-2) obtained in Production Example 8 and the fluorine-based (meth)acrylic resin pellets (A-3P) were used. Results of evaluation on the obtained film are shown in Table 1.

Comparative Example 6

A laminated film having a total film thickness of 75 μm was obtained by performing the same operations as those of Comparative Example 5, except that the thickness of the base resin layer was 72 μm and the thickness of the surface resin layer was 3 μm. Results of evaluation on the obtained film are shown in Table 1.

TABLE 1

| | | | | Examples | | | | | Comparative Examples |
|---|---|---|---|---|---|---|---|---|---|
| | | | | 1 | 2 | 3 | 4 | 5 | 1 |
| | | Lamination Method | | | | Wet Coating | | | Wet Coating |
| Resin Composition (part) | Base Layer Resin | Acrylic resin (C-1) | Acrylic elastic body graft copolymer (C1-1) | | | | | 25 | |
| | | | Methacrylic Polymer (C1-2) | | | | | 75 | |
| | | Acrylic resin (C-2) | Acrylic elastic body graft copolymer (C2-1) | 25 | 25 | 25 | | 25 | 25 |
| | | | Methacrylic Polymer (C2-2) | 75 | 75 | 75 | | 75 | 75 |
| | Surface Layer Resin | Fluorine-based (meth)acrylic resin (A) | Fluorine-containing acrylic resin (A-1) | 100 | | | | 100 | |
| | | | Fluorine-containing acrylic resin (A-2) | | 100 | | 100 | | |
| | | | Fluorine-containing acrylic resin (A-3) | | | | | | 100 |
| | | | Fluorine-containing acrylic resin (A-4) | | | 100 | | | |
| | | | Fluorine-containing acrylic resin (A-5) | | | | | | |
| | | | Fluorine-containing acrylic resin (A-6) | | | | | | |
| | | Melt viscosity Pa·s | 220° C. 122 sec$^{-1}$ | 250 | 170 | 150 | 170 | 250 | 540 |
| | | Reduced viscosity dl/g | Methyl ethyl ketone solvent, 0.1% | 0.39 | 0.16 | 0.15 | 0.16 | 0.39 | 0.66 |
| | | | Chloroform solvent, 0.1% | 0.43 | 0.19 | 0.18 | 0.19 | 0.43 | 0.69 |
| | | Total Film Thickness (μm) | | 75 | 75 | 75 | 75 | 75 | 75 |
| | | (A) Layer Thickness (μm) | | 6 | 6 | 6 | 6 | 3 | 6 |
| Film Properties | | Transparency/Haze Value (%) | | 0.4 | 0.4 | 0.4 | 0.4 | 0.3 | 0.4 |
| | | Chemical Resistance | | Good | Good | Good | Good | Good | Good |
| | Resistance to Sunscreen | Test Method 1 | 54° C. 2 hours, Load of 500 g | Good | Good | Good | Good | Good | Good |
| | | | 64° C., 2 hours, Load of 500 g | Good | Good | Good | Good | Good | Good |
| | | Test Method 2 | 70° C. 24 hours | Good | Good | Good | Good | Good | Good |
| | | | 80° C., 24 hours | Good | Good | Good | Good | Good | Good |
| | | | 90° C., 24 hours | Good | Good | Good | Good | Good | Good |
| | | Lactic Acid Resistance | | Good | Good | Good | Good | Good | Not so Good |
| | | Flex Cracking Resistance | | Good | Good | Good | Good | Good | Good |
| | | Flex Whitening Resistance | | Good | Good | Good | Good | Good | Good |
| | | Surface Hardness | | F-H | F-H | F-H | F-H | F-H | F |
| | Film Productivity | Evaluation Method 1 (Single Layer) | | — | — | — | — | — | — |
| | | Evaluation Method 2 | | — | — | — | — | — | — |

TABLE 1-continued

| | | | | | | | |
|---|---|---|---|---|---|---|---|
| (Laminated: Coextrusion Molding) Evaluation Method 3 (Laminated: Wet Coating) | Good | Good | Good | Good | Good | Good |
| Glass-Transition Temperature: Tg | 82 | 72 | 83 | 72 | 82 | 63 |
| Water Contact Angle at Temperature of 80° C. | 92 | 90 | 86 | 90 | 92 | 83 |

| | | | | Comparative Examples | | | | |
|---|---|---|---|---|---|---|---|---|
| | | | | 2 | 3 | 4 | 5 | 6 |
| | | | Lamination Method | Wet Coating | | Coextrusion Molding | | |
| Resin Composition (part) | Base Layer Resin | Acrylic resin (C-1) | Acrylic elastic body graft copolymer (C1-1) | | | | | |
| | | | Methacrylic Polymer (C1-2) | | | | | |
| | | Acrylic resin (C-2) | Acrylic elastic body graft copolymer (C2-1) | 25 | 25 | 25 | 25 | 25 |
| | | | Methacrylic Polymer (C2-2) | 75 | 75 | 75 | 75 | 75 |
| | Surface Layer Resin | Fluorine-based (meth)acrylic resin (A) | Fluorine-containing acrylic resin (A-1) | | | 100 | | |
| | | | Fluorine-containing acrylic resin (A-2) | | | | | |
| | | | Fluorine-containing acrylic resin (A-3) | | | | 100 | 100 |
| | | | Fluorine-containing acrylic resin (A-4) | | | | | |
| | | | Fluorine-containing acrylic resin (A-5) | 100 | | | | |
| | | | Fluorine-containing acrylic resin (A-6) | | 100 | | | |
| | | Melt viscosity Pa · s | 220° C. 122 sec$^{-1}$ | 130 | 140 | 250 | 540 | 540 |
| | | Reduced viscosity dl/g | Methyl ethyl ketone solvent, 0.1% | 0.14 | 0.15 | 0.39 | 0.66 | 0.66 |
| | | | Chloroform solvent, 0.1% | 0.17 | 0.18 | 0.43 | 0.69 | 0.69 |
| | | Total Film Thickness (μm) | | 75 | 75 | 75 | 75 | 75 |
| | | (A) Layer Thickness (μm) | | 6 | 6 | 6 | 6 | 3 |
| Film Properties | | Transparency/Haze Value (%) | | 0.4 | 0.4 | 1.2 | 0.7 | 0.7 |
| | | Chemical Resistance | | Good | Good | Good | Good | Good |
| | Resistance to Sunscreen | Test Method 1 | 54° C. 2 hours, Load of 500 g | Good | Good | Good | Good | Good |
| | | | 64° C., 2 hours, Load of 500 g | Good | Not so Good | Good | Good | Not so Good |
| | | Test Method 2 | 70° C. 24 hours | Good | Not so Good | Good | Good | Good |
| | | | 80° C., 24 hours | Good | Poor | Good | Good | Not so Good |
| | | | 90° C. 24 hours | Good | Poor | Good | Good | Poor |
| | | Lactic Acid Resistance | | Poor | Poor | Good | Not so Good | Not so Good |
| | | Flex Cracking Resistance | | Good | Good | Good | Good | Good |
| | | Flex Whitening Resistance | | Good | Good | Good | Good | Good |
| | | Surface Hardness | | F-H | F-HB | F-H | F | F |
| | Film Productivity | Evaluation Method 1 (Single Layer) | | — | — | — | — | — |
| | | Evaluation Method 2 (Laminated: Coextrusion Molding) | | — | — | Poor | Poor | Poor |
| | | Evaluation Method 3 (Laminated: Wet Coating) | | Good | Good | — | — | — |
| | | Glass-Transition Temperature: Tg | | 95 | 52 | 82 | 63 | 63 |
| | | Water Contact Angle at Temperature of 80° C. | | 78 | 75 | 91 | 83 | 83 |

In each of Comparative Examples 1 and 2, the lactic acid resistance was low due to their low water contact angle at a temperature of 80° C. In Comparative Example 3, the resistance to the sunscreen and the lactic acid resistance were significantly poor due to its low glass-transition temperature and low water contact angle at a temperature of 80° C. In each of Comparative Examples 4 to 6, the transparency and film productivity of the laminated film were low due to thermal decomposition of the fluorine-based (meth)acrylic resin, which was caused by the melt extrusion. In Comparative Example 6, the resistance to the sunscreen under high-temperature test conditions and the lactic acid resistance were low due to its thin surface layer.

Below, Example Film 2 is compared with a comparative example film (Comp. Ex. 7) and the results are summarized in Table 2. The films were prepared in the same manner as discussed for Example 2, with the only difference being in the fluorine-containing acrylic resin used.

TABLE 2

| | Example 2 | Comparative Example 7 |
|---|---|---|
| Fluorine-Containing Acrylic Resin | 2,2,2-trifluoroethyl methacrylate/methyl methacrylate (MMA)/ methacrylic acid = 90/10/0 (weight ratio) | 2,2,2-trifluoroethyl methacrylate/methyl methacrylate (MMA)/ methacrylic acid = 75/25/2 (weight ratio) |
| Water Contact Angle at Temperature of 80° C. | 90 | 72 |
| Lactic Acid Resistance (80° C. × 24 hr) | Good: No alternation was found. | Poor: Significant degradation of the surface and distinct trace of dissolution were found. |

TABLE 2-continued

|  | Example 2 | Comparative Example 7 |
|---|---|---|
| Initiator | 0.5 parts of 2,2'-azobis(2-methyl butyronitrile) | 0.4 parts of Bis(4-tert-butylcyclohexyl) peroxydicarbonate |
| Solvent | methyl isobutyl ketone | dichloromethane/dichloroethane |
| Polymerization Temperature | 105° C. | 52° C. |

As described above, the fluororesin-laminated acrylic resin film according to the present disclosure realizes well-balanced film properties in terms of chemical resistance, stain resistance to, in particular, lactic acid components contained in human sebum and sweat and chemical products commonly used by humans, such as sunscreens, and favorable film productivity obtained by reducing/eliminating the thermal decomposition of the resin, while maintaining excellent properties of the acrylic resin, such as excellent transparency, flex cracking resistance, flex whitening resistance, and surface hardness. Therefore, the fluororesin-laminated acrylic resin film according to the present disclose is applicable to vehicle interior and exterior components, which are required to satisfy strict standards set for these properties.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A film comprising:
   a coating layer made of a fluorine-containing acrylic resin; and
   a base film, on which the coating layer is laminated,
   wherein the fluorine-containing acrylic resin is obtained by copolymerizing 50 to 99 parts by weight of a monomer represented by a general formula (1) with 50 to 1 parts by weight of a methacrylate-based monomer,
   wherein a melt viscosity of the fluorine-containing acrylic resin is less than 300 Pa·s under conditions of a die temperature of 220° C., a shear rate of 122 sec$^{-1}$, and a capillary die diameter of 1 mm based on JIS K7199, and
   wherein a water contact angle of the coating layer at a temperature of 80° C. is not less than 85°,

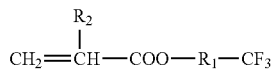

(1)

wherein in the general formula (1), $R_1$ is a direct bond or a straight-chain or branched-chain alkylene group containing 1 to 4 carbon atoms, and $R_2$ is methyl.

2. The film according to claim 1, wherein the base film is an acrylic resin containing rubber particles.

3. The film according to claim 1, wherein a glass-transition temperature of the fluorine-containing acrylic resin is not lower than 70° C.

4. The film according to claim 1, wherein the methacrylate-based monomer is methyl methacrylate.

5. The film according to claim 1, wherein the fluorine-containing acrylic resin is obtained by copolymerizing 70 to 99 parts by weight of the monomer represented by the general formula (1) with 30 to 1 parts by weight of the methacrylate-based monomer.

6. The film according to claim 1, wherein the coating layer is laminated on the base film by a wet coating method.

7. A method of producing the film according to claim 1, the method comprising:
   laminating the fluorine-containing acrylic resin on the base film by a wet coating method.

8. The method of producing the film according to claim 7, wherein the base film is an acrylic resin containing rubber particles.

9. The method of producing the film according to claim 7, wherein a glass-transition temperature of the fluorine-containing acrylic resin is not lower than 70° C.

10. The method of producing the film according to claim 7, wherein the methacrylate-based monomer is methyl methacrylate.

11. The method of producing the film according to claim 7, wherein the fluorine-containing acrylic resin is obtained by copolymerizing 70 to 99 parts by weight of the monomer represented by the general formula (1) with 30 to 1 parts by weight of the methacrylate-based monomer.

12. The method of producing the film according to claim 7, wherein the monomer represented by the general formula (1) is copolymerized with the methacrylate-based monomer by suspension polymerization.

* * * * *